(12) United States Patent
Au et al.

(10) Patent No.: US 7,953,284 B2
(45) Date of Patent: May 31, 2011

(54) SELECTIVE INFORMATION HANDLING FOR VIDEO PROCESSING

(76) Inventors: James Au, Richmond (CA); Barry Moss, Abbotsford (CA)

( * ) Notice: Subject to any disclaimer, the term of this patent is extended or adjusted under 35 U.S.C. 154(b) by 1087 days.

(21) Appl. No.: 11/693,439

(22) Filed: Mar. 29, 2007

(65) Prior Publication Data
US 2008/0240587 A1    Oct. 2, 2008

(51) Int. Cl.
G06K 9/36    (2006.01)
G06K 9/46    (2006.01)

(52) U.S. Cl. .................................................... 382/236

(58) Field of Classification Search .................. 382/232, 382/233, 236; 348/262, 478, 555, 564, 565, 348/567, 588, E5.112, E7.056; 375/148, 375/150, 267, 299, 315, 343, 344; 370/468; 380/234
See application file for complete search history.

(56) References Cited

U.S. PATENT DOCUMENTS

| | | | |
|---|---|---|---|
| 5,142,576 A * | 8/1992 | Nadan ........................... | 380/234 |
| 5,416,529 A * | 5/1995 | Lake ............................. | 348/590 |
| 5,847,771 A * | 12/1998 | Cloutier et al. ................ | 348/564 |
| 5,875,305 A * | 2/1999 | Winter et al. ................. | 709/231 |
| 6,285,408 B1 * | 9/2001 | Choi et al. .................... | 348/555 |
| 6,628,702 B1 * | 9/2003 | Rowitch et al. ............... | 375/150 |
| 7,409,056 B2 * | 8/2008 | LeBlanc et al. ........... | 379/399.01 |
| 7,436,903 B2 * | 10/2008 | Sandhu et al. ................ | 375/315 |
| 2002/0015092 A1 | 2/2002 | Feder et al. | |
| 2005/0196051 A1 * | 9/2005 | Wong et al. ................... | 382/232 |
| 2008/0240228 A1 | 10/2008 | Heinrich et al. | |
| 2008/0240233 A1 | 10/2008 | Au et al. | |
| 2008/0240253 A1 | 10/2008 | Au et al. | |
| 2008/0240254 A1 | 10/2008 | Au et al. | |
| 2008/0240587 A1 * | 10/2008 | Au et al. ....................... | 382/236 |
| 2008/0291940 A1 * | 11/2008 | LeBlanc et al. ............... | 370/468 |

FOREIGN PATENT DOCUMENTS

| | | |
|---|---|---|
| EP | 1 296 520 | 3/2003 |
| EP | 1 355 499 A2 | 10/2003 |
| WO | WO 01/52538 | 7/2001 |
| WO | WO 2008/039321 | 4/2008 |
| WO | WO 2008/121662 A2 | 10/2008 |
| WO | WO 2008/121663 A2 | 10/2008 |

(Continued)

OTHER PUBLICATIONS

Mo Li et al., "A High Throughput Binary Arithmetic Coding Engine for H.264/AVC," Solid-State and Integrated Circuit Technology, 2006, 5 pgs.

(Continued)

*Primary Examiner* — Amir Alavi
(74) *Attorney, Agent, or Firm* — Merchant & Gould

(57) ABSTRACT

A system for selectively handling information. In an example embodiment, the system includes a first mechanism for processing information pertaining to one or more sub-blocks of a macroblock in a first stream and a second stream, and outputting a first processed stream and a second processed stream in response thereto. A second mechanism selectively combines information in the first processed stream and the second processed stream and provides an updated version of the first stream or the second stream to the first mechanism in response thereto. In a more specific embodiment, the first mechanism includes a processor, such as in intra 4×4 search, module, that processes a sub-block of a macroblock by performing intra prediction for the sub-block. The processor is adapted to process sub-blocks of a macroblock in parallel, such as in a pipelined fashion or via separate engines capable of operating in parallel.

21 Claims, 17 Drawing Sheets

FOREIGN PATENT DOCUMENTS

| | | |
|---|---|---|
| WO | WO 2008/121664 A2 | 10/2008 |
| WO | WO 2008/121664 A3 | 10/2008 |
| WO | WO 2008/121667 A2 | 10/2008 |
| WO | WO 2008/121667 A3 | 10/2008 |
| WO | WO 2008/127855 A1 | 10/2008 |

OTHER PUBLICATIONS

Hassan Shojania et al., "A VLSI Architecture for High Performance CABAC Encoding," Visual Encoding and Image Processing, 2005, Proc. Of SPIE vol. 5960, 11 pgs.

Hassan Shojania et al., "A High Performance CABAC Encoder," IEEE-NEWCAS Conference, 2005, 4 pgs.

Hendrik Eeckhaut et al., "Optimizing the critical loop in the H.264/AVC CABAC Decoder," Field Programmable Technology, 2006, pp. 113-118.

Lingfeng Li et al., "A CABAC Encoding Core with Dynamic Pipeline for H.264/AVC Mail Profile," Circuits and Systems, 2006, pp. 760-763.

Detlev Marpe et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 621-636.

Ron Wilson, "The Right Video Architecture Can Make All the Difference," Acquired at: http://www.edn.com/contents/images/6363920.pdf, Sep. 1, 2006, 9 pgs.

Genhua Jin et al., "A Parallel and Pipelined Execution of H.264/AVC Intra Prediction," Proceedings of the Sixth IEEE International Conference on Computer and Information Technology, 2006, 6 pgs.

Wonjae Lee et al., "Pipelined Intra Prediction Using Shuffled Encoding Order for H.264/AVC," Tencon, 2006, IEEE Region Conference, 4 pgs.

Kazushi Sato et al., "Consideration on Intra Prediction for Pipeline Processing in H.264/MPEG-4 AVC," Applications of Digital Image Processing XXVII, Proceedings of SPIE, vol. 5558, 2004, pp. 485-494.

Yu-Wen Huang et al., "Hardware Architecture Design for H.264/AVC Intra Frame Coder," Circuits and Systems, 2004, pp. 269-272.

Jian-Wen Chen et al., "Introduction to H.264 Advanced Video Coding," Design Automation, Asia and South Pacific Conference on Jan. 24, 2006, pp. 736-741.

International Search Report dated Dec. 3, 2008 cited in Application No. PCT/US2008/058349.

International Search Report dated Nov. 10, 2008 cited in Application No. PCT/US2008/058335.

International Search Report dated Nov. 14, 2008 cited in Application No. PCT/US2008/058334.

International Preliminary Report dated Sep. 29, 2009 cited in Application No. PCT/US2008/058334.

European Office Action dated Feb. 11, 2010 cited in Application No. 08 732 886.0.

European Office Action dated Feb. 25, 2010 cited in Application No. 08 780 490.2.

European Office Action dated Mar. 18, 2010 cited in Application No. 08 744 419.6.

European Office Action dated Mar. 18, 2010 cited in Application No. 08 732 889.4.

European Office Action dated Dec. 17, 2010 cited in Application No. 08 732 886.0.

* cited by examiner

|  |  |  |  |
|---|---|---|---|
| 5 | 7 | 13 | 15 |
| right4 | right6 | right12 | right14 |
| 4 | 6 | 12 | 14 |
| right1 | right3 | right9 | right11 |
| 1 | 3 | 9 | 11 |
| right0 | right2 | right8 | right10 |
| 0 | 2 | 8 | 10 |
| nleft3 | nleft2 | nleft1 | nleft0 |

SELECTIVE INFORMATION HANDLING FOR VIDEO PROCESSING

BACKGROUND OF THE INFORMATION

This disclosure relates generally to signal processing and more specifically relates to systems and methods selectively controlling information flow in a video processing or image processing system. Video processing systems are employed in various demanding applications, including high-definition television, missile guidance systems, video conferencing systems, and Internet video streaming. Such applications often demand compact cost-effective systems for encoding, transmitting, and decoding high quality compressed video relatively accurately, quickly, and efficiently.

Efficient video processing systems are particularly important in so-called H.264 applications, where video processing systems are subjected to strict standards. H.264 is digital video codec standard written by the Joint Video Team (JVT) comprising the International Telecommunication Union (ITU)—Telecommunication Standardization Sector (T) and the International Organization for Standardization (ISO)/International Electrotechnical Commission (IEC) Moving Picture Experts Group (MPEG). The H.264 standard is also called the ISO/IEC MPEG-4 Part 10 standard or the ITU-T H.264 standard.

In an example H.264 system, pixels of a video image are logically grouped into 16×16 blocks of pixels called macroblocks. Each macroblock is grouped into sixteen 4×4 blocks of pixels, called sub-blocks. The image is partitioned into horizontal bands, called slices, each containing several macroblocks. When this example H.264 system processes a slice, information, from one or more previously processed macroblocks is typically required before a subsequent macroblock is processed. Similarly, when processing sub-blocks within a macroblock, information from one or more previously processed sub-blocks is typically required before a subsequent sub-block is processed. Unfortunately, such macroblock and sub-block dependencies have resulted in video processing systems that employ relatively inefficient serial processing of macroblocks and sub-blocks. Furthermore, such video processing systems often employ relatively inefficient information handling systems and methods.

BRIEF DESCRIPTION OF THE DRAWINGS

FIG. 7 is a diagram illustrating example labeling of certain columns of pixels of sub-blocks of the macroblock of FIGS. 5 and 6 that are employed by the intra macroblock processors of FIGS. 3b and 4 to process other sub-blocks of the macroblock.

DETAILED DESCRIPTION OF EXAMPLE EMBODIMENTS

Figure 1:
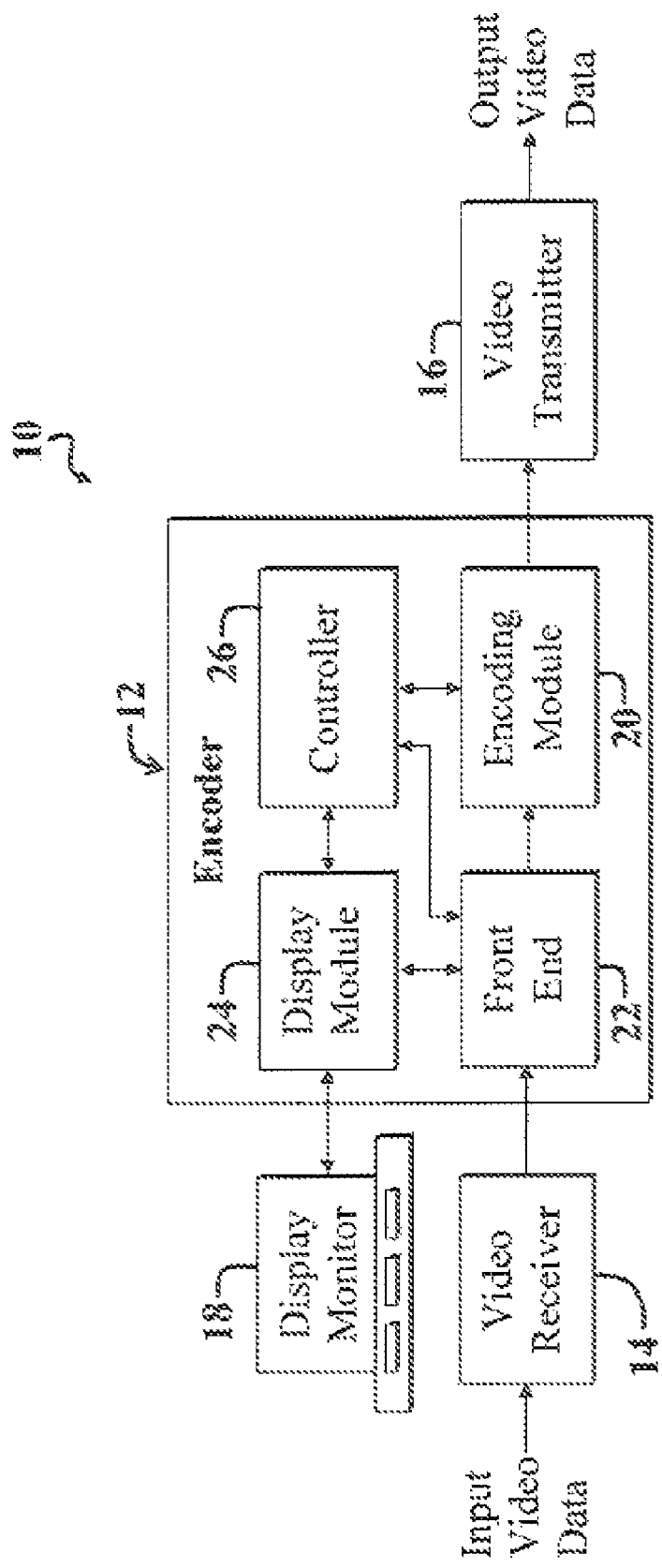
FIG. 1 illustrates an example video-encoding system.

For the purposes of the present discussion, a macroblock may be any grouping of pixels in a frame of data. A sub-block may be any grouping of pixels within a macroblock. A frame may be any set of data that includes plural pixels of information, where a pixel may be a value associated with a data point. A video frame or an image frame may be any collection of data points or pixels that are associated with an image or something to be displayed or viewed. The terms video frame and image frame are employed interchangeably herein. An image may be any thing or representation of a thing that can be viewed. A slice of an image frame may be any contiguous grouping of macroblocks for processing purposes.

An example of a macroblock is the macroblock discussed in the H.264 standard, which includes a 16×16 group of pixels. An example of a sub-block is a 4×4 grouping of pixels. An example of documentation that provides details of the H.264 standard is ISO/IEC 14496-10 (ITU-T H.264). International Standard (2005), Advanced video coding for generic audiovisual services; which is hereby incorporated by reference as if set forth in full in this specification for all purposes. For the purposes of generating a prediction frame, macroblocks within a slice are predicted based on previously predicted macroblocks so that values associated with one macroblock within the slice depend on values associated with one or more other macroblocks within the slice.

An example embodiment of a system for facilitating processing sub-blocks of a macroblock by selectively handling information pertaining to one or more sub-blocks of a macroblock includes a first mechanism for processing information pertaining to one or more sub-blocks of a macroblock in a first stream and a second stream, and outputting a first processed stream and a second processed stream in response thereto. A second mechanism selectively combines information in the first processed stream and the second processed stream and provides an updated version of the first stream and/or the second stream to the first mechanism in response thereto.

In a more specific embodiment, the first mechanism includes a processor, such as in intra 4×4 search module. The processor is adapted to process a sub-block of a macroblock by performing intra prediction for the sub-block. The processor is adapted to process sub-blocks of a macroblock in parallel, such as in a pipelined fashion or via separate engines capable of operating in parallel.

The second mechanism includes a first pixel selector for selectively employing a first portion of the first processed stream and a first portion of the second processed stream to generate the updated version of the first stream. A second pixel selector selectively employs a second portion of the first processed stream and a second portion of the second processed stream to generate the updated version of the second stream. A controller communicates with the first pixel selector and the second pixel selector. The controller includes one or more instructions for implementing a state machine for implementing one or more control signals to selectively direct contents of the first processed stream and the second processed stream into the updated first stream or the updated second stream.

The novel design of this example embodiment is facilitated by use of separate streams to process sub-blocks of a macroblock. By controlling the flow of processed pixels pertaining to sub-blocks in each stream, the need for a large inefficient MUX and accompanying memory to store results of processed pixels is obviated. Instead, results associated with processed sub-blocks in the different streams are directed to the accompanying processor in a particular sequence and fashion, as needed, without the need for lengthy memory storage and data-lookup processes, thereby facilitating parallel processing or pipelining of sub-blocks.

For the purposes of the present discussion, a sub-block is said to be fed to a processor if information pertaining to the sub-block is delivered to the processor to enable processing of the sub-block by the processor. Processes implemented via the parallel engines may include implementing intra prediction for a sub-block.

For the purposes of the present discussion, intra prediction may be any process wherein one or more pixels in an image frame are predicted or estimated based on information associated with the image frame. Intra prediction may include the process wherein values for a predicted sub-block are predicted or ascertained from one or more other sub-blocks within a macroblock of a frame that includes or is to include the macroblock. H.264 intra prediction may be any intra prediction wherein the intra prediction of one sub-block is based on certain previously intra predicted sub-blocks in accordance with H.264 standards. An intra predicted sub-block may be any sub-block that has been reconstructed or otherwise predicted based on one or more other sub-blocks within a macroblock or image frame.

Unlike conventional H.264 systems that must process sub-blocks of a macroblock serially via a single engine, certain embodiments discussed herein enable use of multiple engines to process sub-blocks of a macroblock within an image frame. This may result in improved encoder performance, smaller encoder size, lower power consumption, and lower cost.

For clarity, various well-known components, such as power supplies, H.264 decoders, computer systems, daughter cards, audio encoders, hosts, user interfaces, scaling circuits (Q-1), timing clocks, and so on, have been omitted from the figures. However, those skilled in the art with access to the present teachings will know which components to implement and how to implement them to meet the needs of a given application.

FIG. 1 illustrates an example video-encoding system 10. The encoding system 10 includes an encoder 12, which receives video input from a video receiver 14 and provides resulting compressed video to a video transmitter 16. For illustrative purposes, the encoder 12 is shown communicating with a display 18 for displaying video frames.

The encoder 12 includes an encoding module 20, a front end 22, a display module 24, and a controller 26. The front end 22 communicates with the video receiver 14, the encoding module, the display module 24, and the controller 26. The encoding module 20 further communicates with the controller 26. The display module 24 further communicates with the controller 26 and the display monitor 18.

In operation, the front end 22 formats input from the video receiver 14, which is accessible by the display module 24 and the encoding module 20. The controller 26 provides control input to the display module, the front end 22, and the encoding module 20 to facilitate controlling the operation of the encoder. Input video may be displayed via the display monitor 18 after the video data is formatted and prepared as needed via the display module 24.

In the present example embodiment, the encoding module 20 compresses input video in accordance with one or more H.264 standards and via a pipelined or parallel processing scheme, as discussed more fully below. Example processing functions implemented via the encoding module 20 include inter prediction, intra prediction, frequency transforms, quantization, dequantization, frame subtraction and addition, and entropy coding for video image frames. The encoding module 20 outputs resulting compressed video to the video transmitter 16. The video transmitter 16 may then transmit the resulting video to a decoder, to memory, and so on, as needed for a particular application.

The encoding module 20 may be implemented via one or more daughter cards that are implemented in accordance with the H.264 standard. The front end 22, display module 24, and controller 26 may be implemented via various technologies, including, but not limited to Field Programmable Gate Array (FPGA) and Digital Signal Processor (DSP) technologies.

Figure 2A:
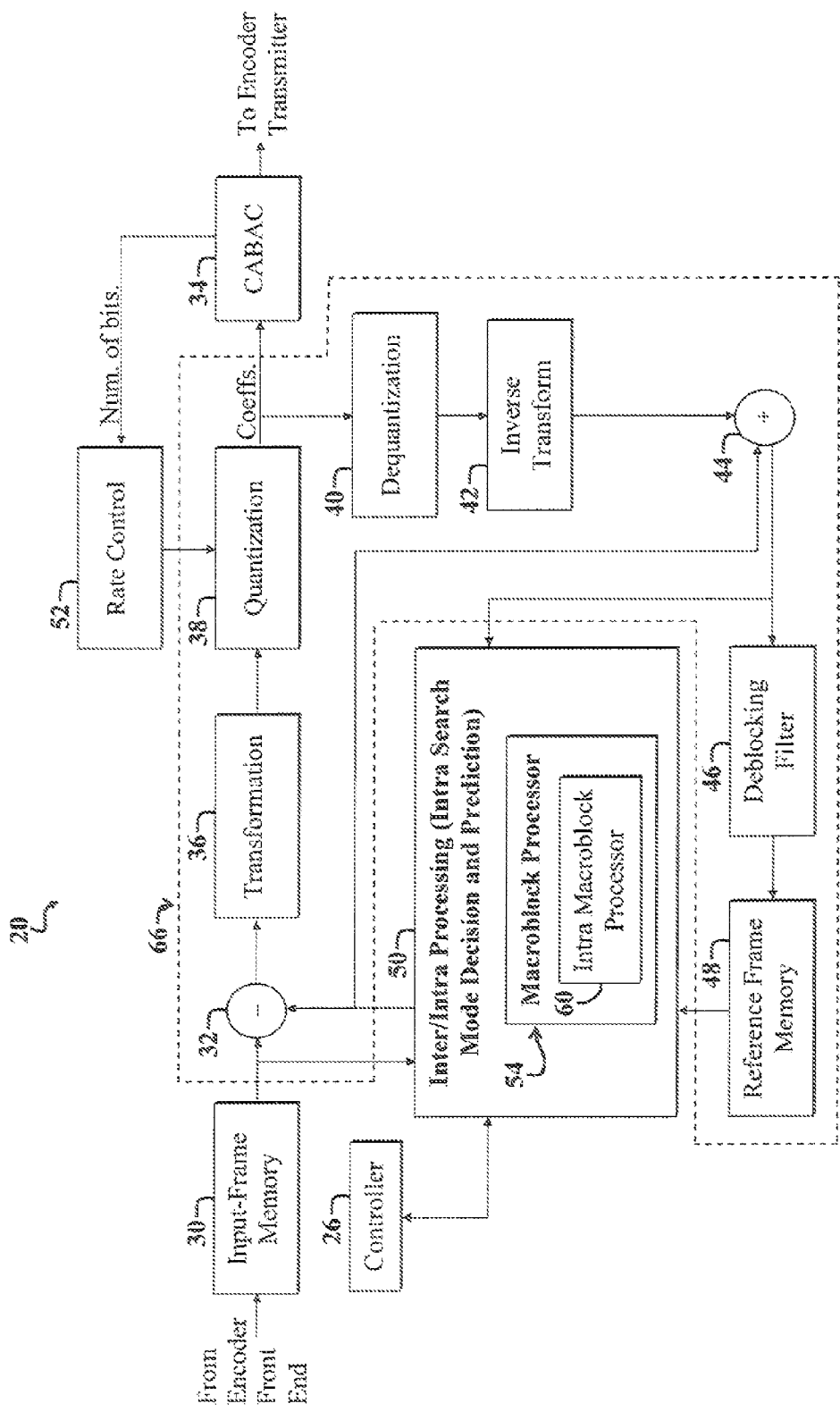
FIG. 2a is a more detailed diagram illustrating example components of a first embodiment of an encoding module usable with the video-encoding system of FIG. 1.

FIG. 2a is a more detailed diagram illustrating example components 30-52 of an encoding module 20 usable with in the video-encoding system 10 of FIG. 1. The encoding module 20 includes an input-frame memory 30 for receiving and selectively storing video frames from the front end 22 of FIG. 1. The output of the input-frame memory 30 is input to a subtracter 32 and to an inter/intra processing module 50. The subtracter 32 also receives input from the inter/intra processing module 50 and provides output to a transformation module 36. An output of the transformation module 36 is coupled to a quantization module 38, also called a quantizer, an output of which is coupled to inputs of a dequantization module 40 and a entropy encoder 34. In the present example embodiment, the entropy encoder 34 implements Context Adaptive Binary Arithmetic Coding (CABAC), and consequently, is also called a CABAC module. The CABAC module 34 provides feedback to a rate control module 52, which provides a rate-control signal to the quantizer 38.

The dequantizer 40 is further coupled to an inverse transform module 42, an output of which is coupled to an input of an adder 44. An output of the adder 44 is coupled to an input of a deblocking filter 46. An output of the deblocking filter 46 is coupled to an input of a reference frame memory 48. An output of the reference frame memory 48 is coupled to an input of the inter/intra processing module 50. An output of the inter/intra processing module 50 is coupled to an input of the subtracter 32 and to an input of the adder 44. The inter/intra processing module 50 further includes a macroblock processor 54 for processing macroblocks within a slice of a video image frame, and an intra macroblock processor 60 for processing sub-blocks of macroblocks processed by the macroblock processor 54. The intra macroblock processor 60 may act as a nested processing loop within a loop governed by the macroblock processor 54 as discussed more fully below, In operation, an input frame from the input-frame memory 30 is provided to the inter/intra processing module 50 and to the subtracter 32. The frame is processed by the encoding module 20 in units of macroblocks. Each macroblock is encoded so-called inter mode or intra mode. In inter mode, the inter/intra processing module 50 executes one or more instructions to facilitate forming a prediction frame based on a previously reconstructed and filtered frame, called a reference frame, which is provided to the inter/intra processing module 50 by the reference frame memory 48. The inter/intra processing module 50 may also implement inter/intra search and mode-decision functions. Details of inter/intra search and mode-decision operations that are known in the art may be readily adapted for use with example embodiments by those skilled in the art, without undue experimentation.

Reference frames used for inter prediction have been filtered by the deblocking filter 46. The inter/intra processing module 50 employs a first feedback loop formed by the inter/intra processing module 50, the subtracter 32, the transformation module 36, the quantization module 38, the dequantizer 40, the inverse transform module 42, the adder 44, the deblocking filter 46, and the reference frame memory 48 to facilitate generating a motion-compensated predicted frame from one or more reference frames.

In intra mode, the inter/intra processing module 50 executes one or more instructions to facilitate forming a prediction frame based on the current frame, as opposed to a reference frame. In intra mode, the inter/intra processing module 50 employs a second feedback loop that includes the inter/intra processing module 50, the subtracter 32, the transformation module 36, the quantizer 38, the dequantizer 40, the inverse transform 42, and the adder 44 to facilitate computing a reconstructed prediction frame. For the purposes of the present discussion, the second feedback loop 32, 36, 38, 40, 42, 44 and the first feedback loop 32, 36, 38, 40, 42, 44, 46, 48, are called the macroblock TQR (Transform, Quantization, Reconstruction) loop 66.

In either mode, a predicted macroblock output by the inter/intra processing module 50 is subtracted from the corresponding macroblock in the input frame that is output from the input-frame memory 30. The resulting macroblock is called a residual or difference macroblock. The difference macroblock is then transformed from a time domain to a frequency domain, such as via a block transform, by the transformation module 36. The resulting transformed macroblock is quantized by the quantizer 38; dequantized by the dequantizer 40; and then transformed back to the time domain via the inverse transform module 42. The resulting, residual macroblock is added to a corresponding macroblock from the prediction frame that is output from the inter/intra processing module 50 before the resulting added macroblock, called a reconstructed macroblock, is input back to the inter/intra processing module 50 as a reconstructed macroblock.

The output of the quantizer 38 represents a set of quantized transform coefficients. These coefficients are then entropy encoded via the CABAC 34. Entropy encoded coefficients and information required to decode a macroblock, such as prediction mode, quantizer step size, and so on, are output from the CABAC 34 via one or more bitstreams. The number of bits employed by the CABAC during a given operation may be fed back to the rate control module 52 to facilitate controlling the rate of the quantizer 38.

Hence, the rate control module 52 generates rate control signals to control the quantizer 38 and accompanying quantization parameters based, on bit-production feedback from a previous frame, picture complexity, current bit buffer levels. The inter/intra processing module 50 may facilitate performing prediction through motion search and intra search mode-decision operations; may implement a mode decision function feat selects a best prediction mode for each macroblock to be processed; and may perform intra compensation to form sample intensity predictions. The terms intra compensation and intra prediction may be employed interchangeably herein. Intra compensation involves predicting a macroblock based on information from the current frame in which the macroblock is a part.

The subtracter 32 outputs residuals representing differences between input data samples from the input-frame memory 30 and prediction samples from the inter/intra processing module 50. The transform module 36 converts residuals to the frequency domain. The quantizer 38 quantizes frequency coefficients, effectively discarding certain information to reduce entropy in the residuals. The dequantizer 40 and inverse transform module 42 are adapted to reconstruct transformed and quantized residuals through dequantization and inverse transform processes. The adder 44 facilitates adding reconstructed residuals output from the inverse transform module 42 to prediction samples output from the inter/intra processing module 50 to reconstruct decoded samples for a given macroblock. The deblocking filter 46 is adapted to remove blocking artifacts from decoded samples output from the adder 44. The CABAC 34 is adapted to implement entropy coding in accordance with H.264 main/high profile. The CABAC 34 codes macroblock modes, prediction information, and residuals, into H.264-compliant bitstreams.

For illustrative purposes, the controller 26 is shown, communicating with the inter/intra processing module 50. The controller 26 may communicate with more modules, different modules, or no modules in FIG. 2a without departing from the scope of the present teachings. Furthermore, the rate-control module 52 and the controller 26 may be implemented in a common control module without departing from the scope of the present teachings.

Example embodiments discussed more fully below pertain primarily to intra prediction mode and corresponding components within the inter/intra processing module 50 for implementing intra prediction mode. Intra prediction mode may involve performing intra prediction. However, those skilled in the art with access to the present teachings may readily adapt the embodiments to accommodate inter prediction mode without undue experimentation and without departing from the scope of the present teachings.

For illustrative purposes, the implementation of FIG. 2a shows a single Transform Quantization Reconstruction (TQR) loop 66 outside of the inter/intra processing module 50. However, in practice, a hardware implementation may incorporate one or more separate TQR loops within the intra macroblock processor 60, as discussed more fully below.

Figure 2B:
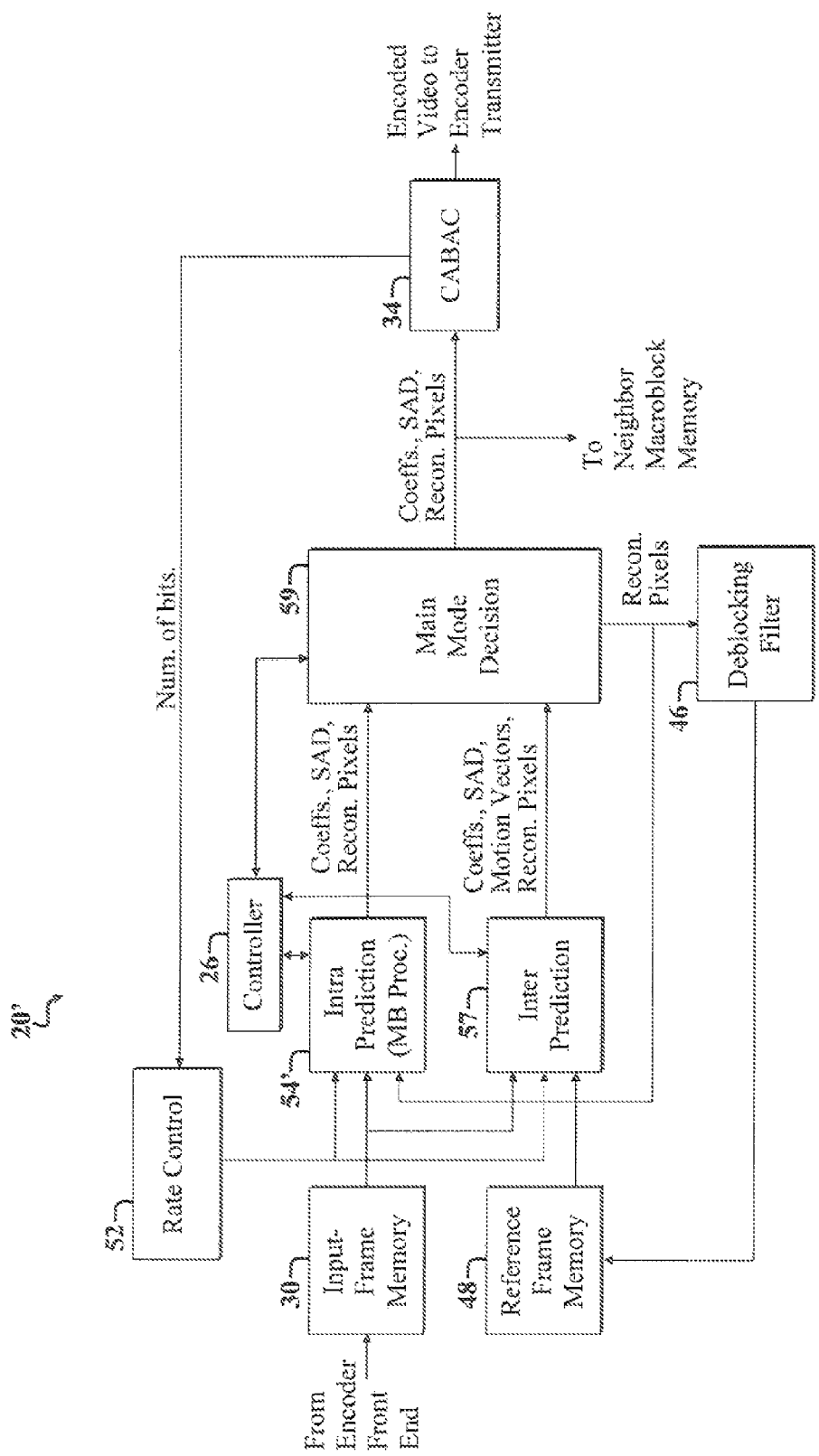
FIG. 2b is more detailed diagram illustrating example components of a second embodiment of an encoding module usable with the video-encoding system of FIG. 1.

FIG. 2b is more detailed diagram illustrating example components of a second embodiment of an encoding module 20' that is usable with the video-encoding system 10 of FIG. 1. The encoding module 20' of FIG. 2b may be substituted for the encoding module 20 of FIGS. 1 and 2a.

The alternative encoding module 20' includes the input-frame memory 30, which may receive input video data from the encoder front end 22 of FIG. 1 and provide input video data to an intra prediction module 54' and to an inter prediction module 57. The reference frame memory 48 receives filtered reconstructed pixel data from the deblocking filter 46. The filtered reconstructed pixel data represents reference video data corresponding to reference frames. The reference frames are provided to the inter prediction module 57 for use in inter prediction calculations.

In the present example embodiment, output from the intra prediction module 54' includes residual coefficients, reconstructed pixels, and Sum of Absolute Difference (SAD) values, which are input to a main decision mode module 59. The SAD values represent a measure of the quality, efficiency, or accuracy of the intra prediction performed by the intra prediction module 54'. Note that while the present embodiment employs SAD values, other figures of merit may be employed in addition to or instead of SAD values to facilitate selecting a desirable or efficient prediction mode, without departing from the scope of the present teachings. The accuracy of the intra prediction is a measure of how closely video data compressed by the intra prediction module 54' matches corresponding video data from the input frame memory 30.

In the present embodiment, the intra prediction module 54' corresponds to the macroblock processor 54 of FIG. 2a. Intra prediction uses information from reconstructed neighboring macroblocks in the same frame to predict the current macroblock. By sending the prediction mode and the transformed and quantized version of the differences (coefficients) between the predicted macroblock and the original macroblock to the mode decision module 59, the information required to reconstruct the macroblock, such as at a decoder, is reduced or compressed.

Similarly, the inter prediction module 57 outputs coefficients, SAD values, motion vectors, and reconstructed pixels to the main mode decision module 59. Inter prediction uses information from a previous frame to predict values for the current macroblock. One inter prediction technique, which may be implemented via the inter prediction module 57, involves searching for a group of pixels in the previous frame that looks similar to a group of pixels in the present frame and then transmitting, to the main mode decision module 59, a motion vector along with the transformed and quantized version of the differences between the predicted macroblock and the original macroblock from the input frame memory 30. Note that the inter prediction module 57 employs reference frames that have been filtered by the deblocking filter 46 and employs original input frames from the input frame memory 30 to facilitate performing inter prediction. Inter prediction may be more efficient or otherwise more preferred than intra prediction in certain situations and vice versa.

The main mode decision module 59 includes instructions for selecting a preferred prediction method based on output from the intra prediction module 54' and the inter prediction module 57. For example, in certain situations, such as when a video changes scenes or otherwise changes suddenly, output from the intra prediction module 54' may be chosen as the output of the main mode decision module. In other situations, such as when successive frames of a video are very similar, output from the inter prediction module 57 may be chosen as the output of the main mode decision module 59. Generally, intra prediction is often performed when encoding so-called I-frames, which are defined in accordance with H.264 standards. Inter prediction, is often performed when encoding P-frames, which are also defined in accordance with H.264 standards. When encoding P-frames, it is possible to encode a frame using a combination of inter prediction and intra prediction. Exact details of methods implemented by the main mode decision module 59 are application specific. Those skilled in the art with access to the present teachings may readily implement appropriate methods to meet the needs of a given application, without undue experimentation.

The intra prediction module 54' and the inter prediction module 57 include TQR loops as discussed, more fully below. The TQR loops facilitate reconstructing pixels and providing residual coefficients to the main mode decision module 59.

The operation of the rate control module 52 in FIG. 2b is similar to the operation of the rate control module 52 in FIG. 2a in that the rate control modules 52 of FIGS. 2a and 2b employ feedback from the CABAC module 34 to facilitate controlling the rate at which intra prediction and/or inter prediction are performed.

For illustrative purposes, the controller 26 is shown communicating with the intra prediction module 54' and the inter prediction module 57. Note, however, that the controller 26 may be implemented separately from the controller 26 of FIG. 1 without departing from the scope of the present teachings. Furthermore, while only one controller 26 is shown, multiple controllers may be employed.

In the present specific embodiment, the intra prediction module 54' is adapted to perform parallel processing of sub-blocks of a macroblock. The intra prediction module 54' employs a neighbor pixel selector that strategically controls the flow of sub-block information during intra prediction operations, thereby facilitating parallel processing; obviating the need to store the sub-block information in a large memory; and further obviating the need to use a relatively bulky inefficient multiplexer to read from the large memory, as discussed more fully below.

Figure 3A:
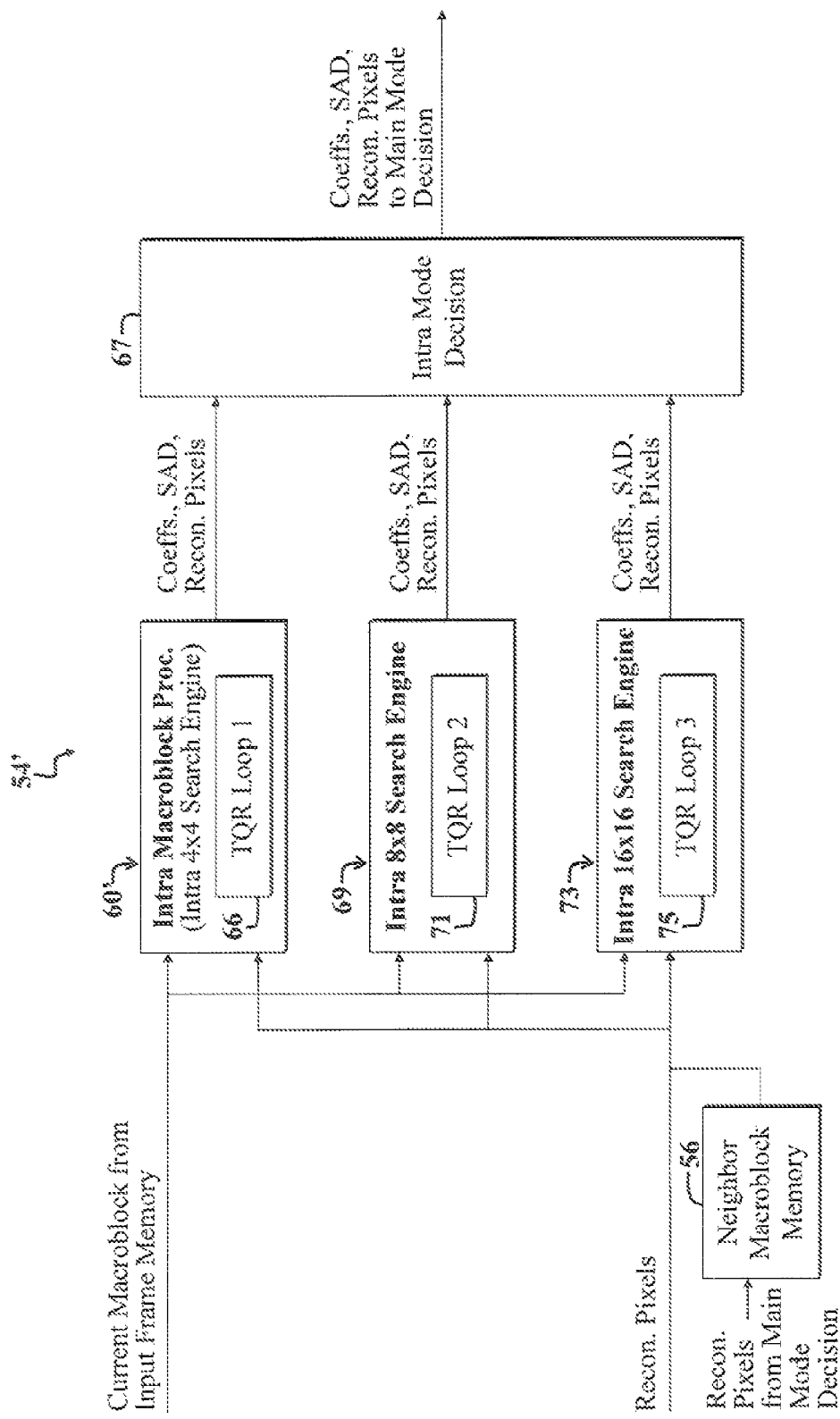
FIG. 3a is a more detailed diagram illustrating example components of the intra prediction module of the encoding module of FIG. 2b.

FIG. 3a is a more detailed diagram illustrating example components of the intra prediction module 54' of the encoding module 20' of FIG. 2b. The intra prediction module 54' includes an intra 4×4 search engine 60', also called an intra macroblock processor. For illustrative purposes, the intra macroblock processor 60' of FIG. 3a is similar to the intra macroblock processor 60 of FIG. 2a, with the exception that the macroblock processor 60' of FIG. 3a includes the TQR loop 66. However, a substantially different macroblock processor may be employed in FIG. 3a with out departing from the scope of the present teachings.

The intra prediction module 54' further includes an optional intra 8×8 search engine 69, and an intra 16×16 search engine 69. The search engines 60', 69, 73 include individual TQR loops 66, 71, 75. The search engines 60', 69, 73 receive input macroblock data from an input frame memory, such as the memory 30 of FIG. 2b, and also receive reconstructed pixel information from the output of the main mode decision module 59 of FIG. 2b. The search engines 60', 69, 73 then perform intra 4×4 prediction, intra 8×8 prediction, and 16×16 prediction, respectively, to provide corresponding coefficients, SAD values, and reconstructed pixels to an intra mode decision module 67. The intra mode decision module 67, then performs implements instructions for selecting a preferred intra search method. In the present specific embodiment, intra mode decision module 67 is adapted to select the output of the search engines 60', 69, 73 that employs the fewest number of bits to encode a given macroblock.

The search engines 60', 69, 73 are also called sub-engines, since they are within the intra prediction module 54'. The output from the search engine 60', 69, 73 that is selected by the intra mode decision module 67 is forwarded to main mode decision 59 of FIG. 2b.

The intra 4×4 search engine 60' is adapted to process sub-blocks of a macroblock in parallel, such as in a pipelined fashion, as discussed more fully below. The intra 4×4 search engine 60' is further adapted to strategically control the flow of information pertaining to processed sub-blocks of each macroblock, to achieve various efficiencies, such as obviating the need for a large memory, and to facilitate parallel processing, as discussed more fully below.

Figure 3B:
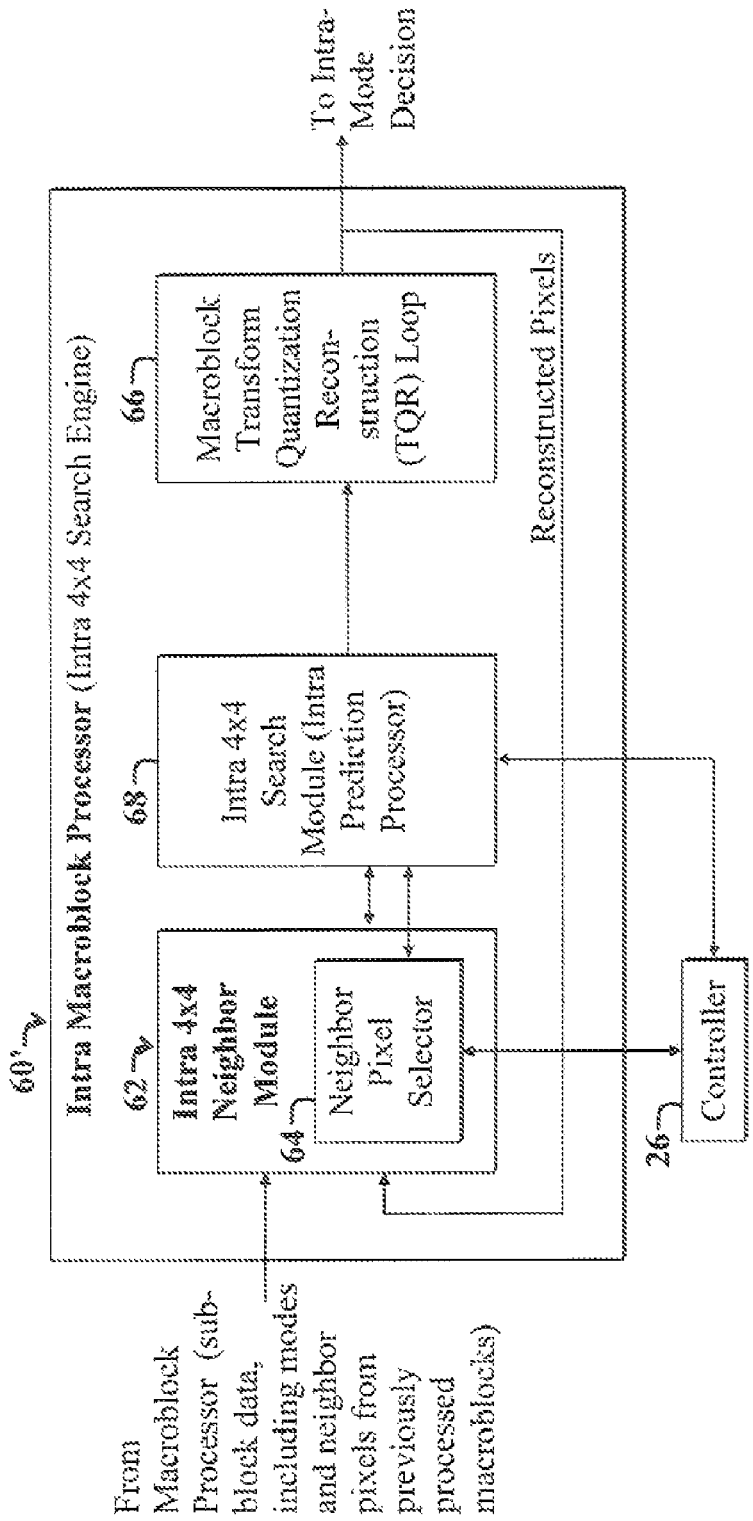
FIG. 3b is a more detailed diagram illustrating example components of the intra macro-block processor included in the encoding modules of FIG. 2a and 2b and used for parallel processing of video macroblock sub-blocks.

FIG. 3b is a more detailed diagram illustrating example components of the intra macroblock processor 60' of FIG. 3a, which is included in the intra prediction module 54' of the encoding module 20' of FIG. 2b and used for parallel processing of video macroblock sub-blocks. The intra macroblock processor 60' may be employed as the intra macroblock processor 60 of FIG. 2a by moving the TQR loop 66 outside of the macroblock processor 60' of FIG. 3b, as shown in FIG. 2a.

The intra macroblock processor 60', also called an engine, includes an intra 4×4 neighbor module 62 in communication with an intra 4×4 search module 68, also called an intra prediction processor. The macroblock processor 60' further includes the TQR loop 66. The intra 4×4 neighbor module 62 includes a neighbor pixel selector 64, which communicates with the intra 4×4 search module 68 and the controller 26. The intra 4×4 search module 68 also communicates with the controller 26. An output of the intra 4×4 search module 68 is input to the macroblock TQR loop 66. For clarity, certain signal paths have been omitted from the TQR loop 66, such as signal paths from an input-frame memory, rate-control loops, and so on. The TQR loop 66 outputs reconstructed pixels as feedback to the intra 4×4 neighbor module 62 and accompanying neighbor pixel selector 64.

In operation, the intra 4×4 neighbor module 62 receives sub-block data, such as modes and neighboring pixels from previously processed macroblocks. The previously processed macroblock information may come from the macroblock processor 60', the frame memory 30 of FIG. 2, or from another memory or processor. The output of the intra 4×4 search module 68 includes sub-block data, such as prediction modes and pixel values for predicting corresponding residuals or difference signals to be transformed, quantized, dequantized, and inverse transformed by the TQR loop 66 to produce reconstructed pixels. The output of the intra 4×4 search module 68 may also include a Sum of Absolute Differences (SAD) or other figures of merit, which are used by the intra mode decision module 67 of FIG. 3a to select a preferred or suitably efficient prediction mode. Exact details of criteria for determining a preferred or efficient prediction mode are application specific. Those skilled in the art with access to the present teachings may readily implement appropriate criteria to meet the needs of a given application without undue experimentation.

The intra 4×4 neighbor module 62 executes instructions for determining the neighboring pixels for each sub-block and acts as the main sequencer for the intra macroblock processor 60'. When neighboring pixels for a given sub-block have been determined, the intra 4×4 neighbor module 62 directs the intra 4×4 search module 68 to perform intra prediction calculations and associated comparisons for the sub-block. This is done for each 4×4 sub-block of pixels within a 16×16 macroblock. Subsequently, transformation, quantization, inverse quantization and inverse transformation are performed in the TQR loop 66. Resulting reconstructed pixels are fed back to the intra 4×4 neighbor module 62 for the extraction of neighboring pixels for use in the prediction of subsequent sub-blocks. The intra 4×4 neighbor module 62 selectively operates on 4×4 sub-blocks of pixels in two streams or groupings of data, which allows for some pipelining or other parallel processing of sub-blocks and macroblocks when sufficient pre-existing information exists to process each sub-block or macroblock to be processed in parallel.

The neighbor pixel selector 64 acts to control the flow of information pertaining to the processing of a first sequence of sub-blocks and a second-sequence of sub-blocks, by strategically feeding back data to the intra 4×4 search module 68 for processing at certain times so that the intra 4×4 search module 68 has appropriate data available to process certain sub-blocks in parallel via parallel engines or pipelining, as discussed more fully below. Use of the neighbor pixel selector 64 may obviate the need for a large multiplexer and accompanying memory to store and retrieve certain pixel information needed by the intra 4×4 search module 68.

Although the neighbor pixel selector 64 is shown incorporated within the intra 4×4 neighbor module 62 in the present example embodiment, the neighbor pixel selector 64 can be moved outside of the intra 4×4 neighbor module without departing from the scope of the present teachings.

In the present example embodiment, the intra 4×4 search module 68 is configured to accept back-to-back sub-blocks for processing in a pipelined fashion. For the purposes of the present discussion, two sub-blocks are said to be processed in a pipelined fashion by a processor, engine, or computer, if at any given time during processing, the processor, engine, or computer works on processing both macroblocks. The pipelined processing may be staggered so that the processor, engine, or computer completes processing of one sub-block before completing processing of the other sub-block. Two sub-blocks are said to be processed in parallel if at least a portion of each of the two sub-blocks are being processed simultaneously by one or more processors, engines, or computers. Hence, two macroblocks that are being processed in a pipelined fashion are also being processed in parallel but not necessarily vice versa. Parallel processing may occur via separate processors, engines, or computers that are working or processing simultaneously. The term "to process a sub-block" may mean to perform any computation or set of instructions associated with the sub-block, including, but not limited to generating pixels, reconstructing pixels, determining prediction modes, or other values for the sub-block.

Figure 4:
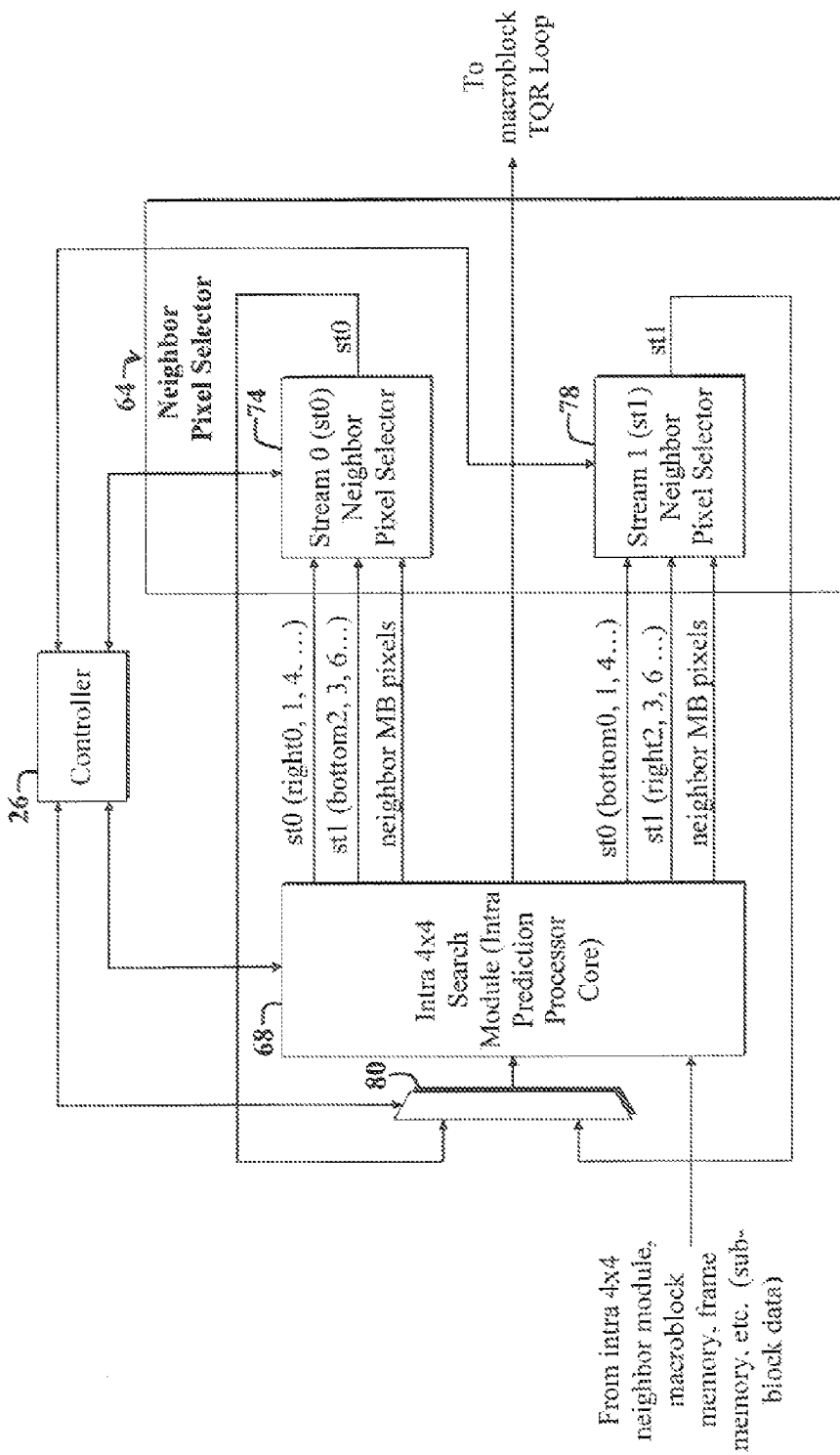
FIG. 4 is a more detailed diagram illustrating the neighbor pixel selector and its interaction with the intra 4×4 search module of FIG. 3b.

FIG. 4 is a more detailed diagram illustrating the neighbor pixel selector 64 and its interaction with the intra 4×4 search, module 68 of FIG. 3b. For illustrative purposes, the intra 4×4 neighbor module 62 of FIG. 3, which includes the neighbor pixel selector 64, is not shown in FIG. 4. Furthermore, an additional stream-partitioning MultipleXer (MUX) 80 is shown interfacing output from the neighbor pixel selector 64 with the intra 4×4 search module 68. The stream-partitioning MUX 80 may be implemented within the intra 4×4 search module 68 or the neighbor pixel selector 64 without departing from the scope of the present teachings.

The neighbor pixel selector 64 includes a first neighbor pixel selector 74 and a second neighbor pixel selector 78, which receive input from the intra 4×4 search module 68 and provide output to the stream-partitioning MUX 80. Output from the stream-partitioning MUX 80 is input to the intra 4×4 search module 68. In intra 4×4 search module 68 also receives sub-block data as input from the intra 4×4 neighbor module 62 of FIG. 3b; from the input frame memory 30, and/or from another memory or processor. For the purposes of the present discussion, sub-block data may be any information associated with a sub-block of a macroblock, including pixels thereof, vectors associated therewith, etc. The controller 26 communicates with and controls the operation of the stream-partitioning MUX 80, the first neighbor pixel selector 74, and the second neighbor pixel selector 78. Note that while the controller 26 of FIG. 4 is shown as the same controller 26 of the encoder 10 of FIG. 1, the controller 26 of FIG. 4 may be implemented as a separate controller without departing from the scope of the present teachings. Generally, while control operations are shown consolidated within the controller 26, various control operations may be distributed in different control modules.

In operation, the intra 4×4 search module 68 receives initial sub-block information associated with a first stream of data from the intra 4×4 neighbor module 62 or another memory. The intra 4×4 search module 68 performs intra prediction calculations based on the sub-block information to generate pixels, which are reconstructed via the TQR loop 66 of FIG. 3b and returned back to the intra 4×4 search module 68 via the intra 4×4 neighbor module 62. The reconstructed pixels correspond to a reconstructed, i.e., predicted, sub-block. If the reconstructed sub-block is associated with a first predetermined sequence of sub-blocks in a macroblock, the sub-block is associated with so-called data stream 0 (st0), otherwise, the sub-block is considered to be associated with a second predetermined sequence of sub-blocks within the macroblock and is associated with data stream 1 (st1).

When processing or predicting sub-blocks in a macroblock according to H.264 standards, the prediction calculations for a subsequent sub-block in a macroblock require predicted or reconstructed pixels from certain other sub-blocks in the macroblock. Such processing dependencies affect the order in which sub-blocks of a macroblock are processed.

In the present example embodiment, the first stream of sub-blocks and the second stream of sub-blocks are chosen so that when the first stream and the second stream are selectively fed into the intra 4×4 search module 68, that certain processing dependencies are met based on information received in the streams to enable parallel processing. In the present example embodiment, the intra 4×4 search module 68 executes one or more instructions to enable parallel processing of certain sub-blocks in a given macroblock, such as via a pipelined engine or via parallel engines, i.e., processors.

When sub-blocks of the first sequence of sub-blocks and sub-blocks of second sequence of sub-blocks are consecutively numbered 0-15 according to H.264 standards, the first sequence of sub-blocks includes sub-blocks numbered 0 and 1, and the second sequence of sub-blocks includes sub-blocks numbered 14 and 15, as discussed more fully below. The remaining sub-blocks of the first sequence and the second sequence are chosen to enable the processor, i.e., the intra 4×4 search module 68, to execute one or more instructions to process pairs of sub-blocks numbered 2 and 4; 3 and 5; 8 and 6; 9 and 7; 10 and 12; and 11 and 13 after sub-blocks 0 and 1 in parallel.

The first neighbor pixel selector 74 receives certain pixels associated with stream 0 and certain pixels associated with stream 1 that are used to process a subsequent sub-block in the first sequence of sub-blocks. The first neighbor pixel selector 74 then selectively switches portions of stream 0 and portions of stream 1 onto the output of the first neighbor pixel selector 74. The output of the first neighbor pixel selector 74 represents an updated stream 0, which is fed back to the intra 4×4 search module 68 via the stream-partitioning MUX 80, as discussed more fully below. The first neighbor pixel selector 74 also receives pixel information as needed pertaining to pixels from one or more neighboring macroblocks. The neighboring pixels are selectively inserted into the updated stream 0 as needed to facilitate processing of one or more subsequent sub-blocks.

The second neighbor pixel selector 78 operates similarly to the first neighbor pixel selector 74, with the exception that it uses portions of stream 0, stream 1, and neighboring macroblock pixels to produce an updated stream 1. The intra 4×4 search module 68 may employ the updated stream 1 to predict, i.e., process one or more subsequent sub-blocks in the second sequence of sub-blocks. The neighbor pixel selectors 74, 78 may be implemented via one or MUXs that are selectively controlled by a state machine running on the controller 26, as discussed more fully below.

Hence the neighbor pixel selector 64, controller 26, and intra 4×4 search module 68 may be considered an example of a system for selectively handling information, where the system includes a first mechanism 68 for processing information pertaining to one or more sub-blocks of a macroblock in a first stream (st0) and a second stream (st1), and outputting a first processed stream (st0 (right0, 1, 4, . . . ) and st0 (bottom0, 1, 4 . . . )) and a second processed stream (st1 (bottom2, 3, 6 . . . ) and st1 (right2, 3, 6 . . . )) in response thereto. A second mechanism 26, 64 selectively combines information in the first processed stream and the second processed and provides an updated version of the first stream (st0) or the second stream (st1) to the first mechanism 68 in response thereto.

The first mechanism includes the intra prediction processor, i.e., intra 4×4 search module 68, which is adapted to process a sub-block of a macroblock. The processor 68 is adapted to process sub-blocks in parallel, such as by performing intra prediction of sub-blocks in parallel. The state machine running on the controller 26 includes one or more instruction for selectively directing contents of the first processed stream and the second processed stream into the updated first stream (st0) or the updated second stream (st1).

The neighbor pixel selector 64 may be considered an apparatus for selectively handling information, wherein the apparatus 64 includes a first switch 74 for selectively outputting a first portion of a first stream and a first portion of a second stream in a third stream (st0) and a second switch 78 for selectively outputting a second portion of the first stream and a second portion of the second stream in a fourth stream (st1). The first stream is associated with a first sequence of sub-blocks of a macroblock, and the second stream is associated with a second sequence of sub-blocks of a macroblock.

The third stream (st0) represents an updated version of the first stream (st0). The fourth stream (st1) represents an updated version of the second stream (st1). The first sequence and the second sequence include sub-blocks with interdependencies such that processing of certain sub-blocks from the first sequence may occur in parallel with processing of certain sub-blocks of the second sequence.

While in the present example embodiment, sub-blocks of macroblocks are processed in parallel, and macroblocks are processed in parallel. Parallel processing is facilitated by unique ordering of data streams in accordance with the present teachings. Those skilled in the art with access to the present teachings may readily implement the details of a parallel or pipelined processor and accompanying video encoder without undue experimentation.

Additional example systems for processing macroblocks and/or sub-blocks in parallel are disclosed in U.S. patent application Ser. No. 11/693,506, entitled PARALLEL OR PIPELINED MACROBLOCK PROCESSING, and U.S. patent application Ser. No. 11/693,473, entitled INTRA MACROBLOCK VIDEO PROCESSING, which are assigned to the assignee of the present invention and which are hereby incorporated by reference herein.

Figure 5:
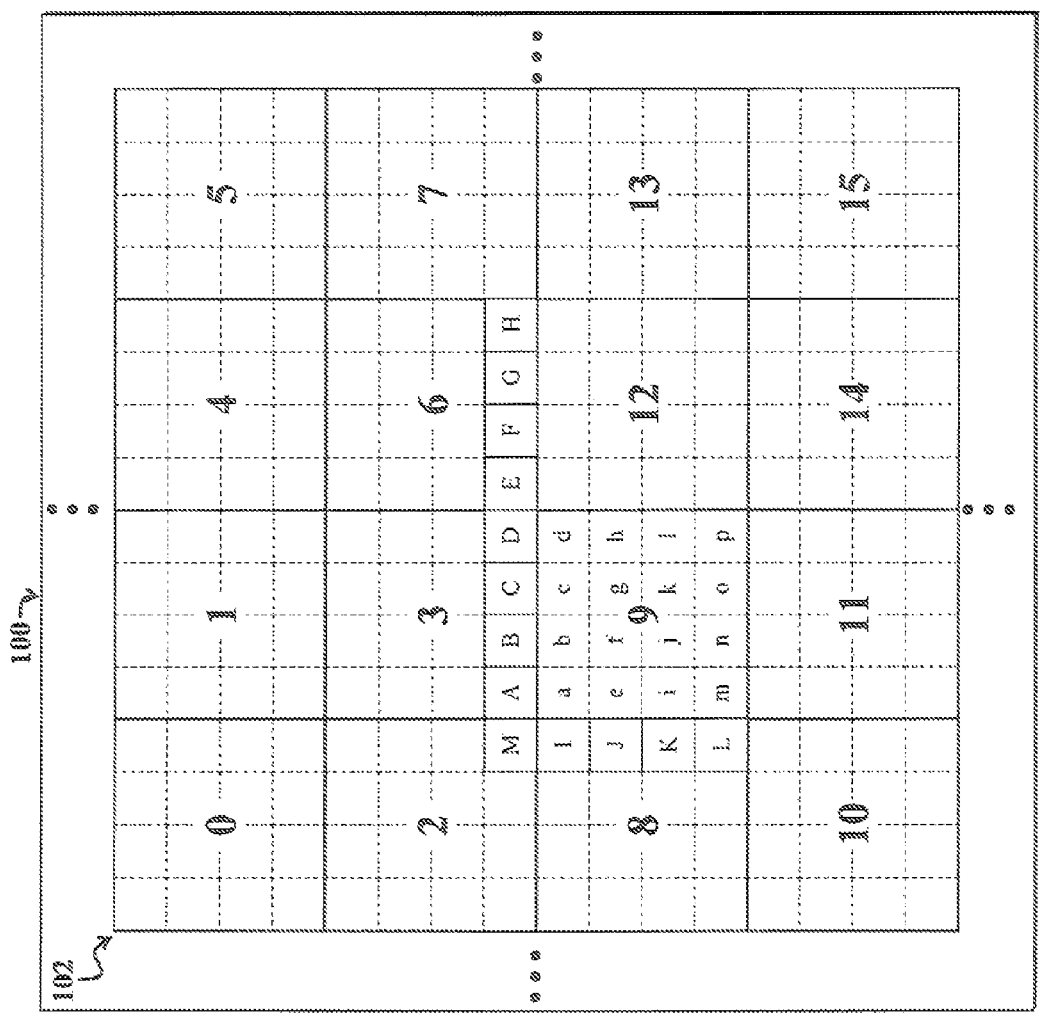
FIG. 5 is a diagram of an example frame illustrating a macroblock, constituent sub-blocks, and neighboring pixels of adjacent sub-blocks used to process an example sub-block.

FIG. 5 is a diagram of an example frame 100 illustrating a macroblock 102 with sixteen constituent Sub-Blocks (SBs 0→15) numbered 0-15, and neighboring pixels (pixels A→M) of adjacent sub-blocks used to process an example sub-block (SB9). The macroblock 102 represents a 16×16 square of pixels, which are partitioned into sixteen squares of sub-blocks. Each sub-block includes a 4×4 square of sixteen pixels (labeled a→p).

With reference to FIGS. 3-5, in the present example, pixels A→M of SBs 2, 3, 6, 8 are employed by the intra macroblock processors 60, 60' to predict pixels a→p of SB 9. For the purposes of the present example, SB9 is said to be processed when the constituent pixels a→p are predicted.

Similarly, other sub-blocks of the macroblock 102 use previously predicted, i.e., processed pixels of sub-blocks to the left, upper left, above, and to the upper right of the sub-blocks. For example, the processing of SB3 requires previously processed pixels from SBs 0, 2, 1, and 4. As another example, the processing of SB0 uses previously processed pixels from neighboring macroblocks. In particular, SB0 would use pixels from the tenth and eleventh sub-block of a macroblock (not shown) above the macroblock 102. The processing of SB0 would also use pixels from the fifteenth sub-block of the macroblock to the upper left of the macroblock 102; would use pixels from fifth sub-block of the macroblock to the left of the macroblock 102. Pixel information from neighboring macroblocks may be retrieved or delivered to the intra macroblock processors 60, 60' from one or more memories associated with the inter/intra processing modules 54, 54' of FIGS. 2a and 2b.

Note that the successful processing of SB9 according to H.264 standards depends upon the results of the processing of SBs 2, 3, 6, 8. Conventionally, sub-blocks are processed serially due to such dependencies on previously processed sub-blocks. However, in certain example embodiments discussed herein, sub-blocks are selectively processed in parallel, such as via a pipelined processor implemented via the intra 4×4 search module 68 of FIGS. 3b and 4. The intra 4×4 search module 68 takes advantage of the ordering of sub-blocks within a macroblock, such as the macroblock 102, as discussed more fully below.

Processing dependencies for the processing of a given sub-block for the macroblock 102 are summarized in Table 1 below.

TABLE 1

| Sub-block (SB) | Previously processed Sub-blocks (SBs) in the current macroblock used to process the indicated sub-block |
| --- | --- |
| 0 | |
| 1 | 0 |
| 2 | 0, 1 |
| 3 | 0, 1, 2, 4 |
| 4 | 1 |
| 5 | 4 |
| 6 | 1, 3, 4, 5 |
| 7 | 4, 5, 6 |
| 8 | 2, 3 |
| 9 | 2, 3, 6, 8 |
| 10 | 8, 9 |
| 11 | 8, 9, 10, 12 |
| 12 | 3, 6, 7, 9 |
| 13 | 6, 7, 12 |
| 14 | 9, 11, 12, 13 |
| 15 | 12, 13, 14 |

Figure 6:
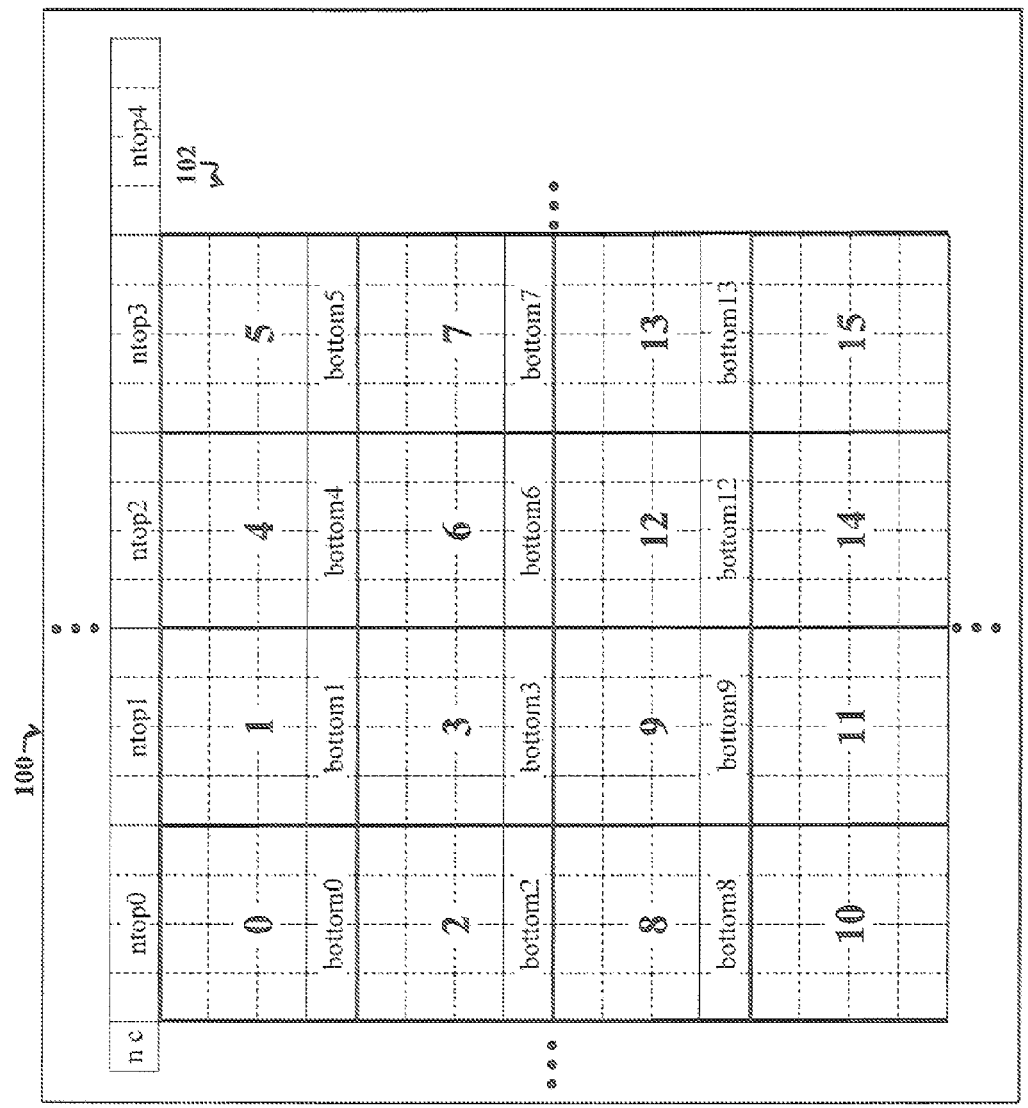
FIG. 6 is a diagram illustrating example labeling of certain rows of pixels of sub-blocks, of the macroblock of FIG. 5 that are employed by the intra macroblock processors of FIGS. 3b and 4 to process other sub-blocks of the macroblock.

FIG. 6 is a diagram illustrating example labeling of certain rows of pixels of sub-blocks (SBs 0→15) of the macroblock 102 of the frame 100 of FIG. 5 that are employed by the intra macroblock processors 60, 60' and accompanying intra 4×4 search module 68 of FIGS. 2-4 to process other sub-blocks of the macroblock 102. Pixels in a row of pixels directly above SB0, which are positioned in the macroblock above the macroblock 100, are labeled ntop0 pixels. The pixel to the upper left of SB0 is labeled nc, which is also called the ncorner pixel.

Pixels in a row of pixels directly above SB1 are labeled ntop1. Pixels in a row of pixels directly above SB4 are labeled ntop2. Similarly, pixels in a row of pixels directly above SB5 are labeled ntop3. In addition, pixels in a bottom row of a sub-block of a macroblock diagonally to the upper right of the macroblock 100 are labeled ntop4 pixels. As an example, with reference to FIG. 5, the ntop0 pixels and the ntop1 pixels correspond to A→D and E→G pixels for SB0, respectively.

Rows of pixels within the macroblock 102 that are used for the processing of other sub-blocks are labeled bottom0→bottom15, as they are positioned in SBs 0→15, respectively. As an example, with reference to FIGS. 5 and 6, bottom3 and bottom6 pixels represent pixels A→H used by SB9.

FIG. 7 is a diagram illustrating example labeling of certain columns of pixels of SBs 0→15 of the macroblock 102 of FIGS. 5 and 6 that are employed by the intra macroblock processors 60, 60' and accompanying intra 4×4 search module 68 of FIGS. 2-4 to process other sub-blocks of the macroblock 102. Pixels in a column of pixels directly to the left of SB10, which are positioned in a macroblock directly to the left the macroblock 102, are labeled nleft0 pixels. Pixels in a column of pixels directly to the left of SB8 are labeled nleft1. Pixels directly to the left of SB2 are labeled nleft2. Similarly, pixels in a column of pixels directly to the left of SB0 are labeled nleft3.

Columns of pixels within the macroblock 102 that are used for the processing of other SBs are labeled right0→right15, as they are positioned in SBs 0→15, respectively. As an example, with reference to FIGS. 3-7, right8 pixels and the bottom pixel of the right2 pixels are used by the intra 4×4 search module of FIGS. 3b and 4, in addition to the bottom3 and bottom6 pixels of FIG. 6, to process SB9. The right8 pixels correspond to pixels I→L of FIG. 5. The bottom pixel of the right2 pixels corresponds to pixel M of FIG. 5.

Processing dependencies for the processing of a given sub-block for the macroblock 102 in accordance with the present labeling are summarized in Table 2 below.

TABLE 2

| | Pixels Used Process Sub-Block | | | |
| --- | --- | --- | --- | --- |
| Sub-Block Number | Pixels A, B, C, D | Pixels E, F, G, H | Pixels I, J, K, L | Pixel M |
| 0 | ntop0 | ntop1 | nleft3 | ncorner |
| 1 | ntop1 | ntop2 | right0 | ntop0 |
| 2 | bottom0 | bottom1 | nleft2 | nleft3 |
| 3 | bottom1 | bottom4 | right2 | bottom0 |
| 4 | ntop2 | ntop3 | right1 | ntop1 |
| 5 | ntop3 | ntop4 | right4 | ntop2 |
| 6 | bottom4 | bottom5 | right3 | bottom1 |
| 7 | bottom5 | right pixel of bottom5 x4 | right6 | bottom4 |
| 8 | bottom2 | bottom3 | nleft1 | nleft2 |
| 9 | bottom3 | bottom6 | right8 | bottom2 |
| 10 | bottom8 | bottom9 | nleft0 | nleft1 |
| 11 | bottom9 | bottom12 | right10 | bottom8 |
| 12 | bottom6 | bottom7 | right9 | bottom3 |
| 13 | bottom7 | right pixel of bottom7 x4 | right12 | bottom6 |
| 14 | bottom12 | bottom13 | right11 | bottom9 |
| 15 | bottom13 | right pixel of bottom13 x4 | right14 | bottom12 |

Direct implementation of a pixel selector to deliver the pixels used to process each sub-block to the intra 4×4 search module 68 of FIGS. 3b and 4 could include a large MUX implemented via a Field Programmable Gate Array (FPGA) to selectively retrieve the needed information from a memory. Unfortunately, such an implementation may be undesirably bulky and inefficient.

The information present in Table 2 may be partitioned into two streams, including a first stream (stream 0) and a second stream (stream 1) corresponding to Tables 3 and 4 below, respectively. For the purposes of the present discussion, a stream may be any grouping of one or more signals or sequences of data. A stream may not necessarily be delivered along a single signal path.

TABLE 3

Stream 0

| | Pixels Used to Process Sub-Block | | | |
|---|---|---|---|---|
| Sub-Block Number | Pixels A, B, C, D | Pixels E, F, G, H | Pixels I, J, K, L | Pixel M |
| 0 | ntop0 | ntop1 | nleft3 | nc |
| 1 | ntop1 | ntop2 | right0 | ntop0 (1 pixel) |
| 4 | ntop2 | ntop3 | right1 | ntop1 (1 pixel) |
| 5 | ntop3 | ntop4 | right4 | ntop2 (1 pixel) |
| 8 | bottom2 | bottom3 | nleft1 | nleft2 (1 pixel) |
| 9 | bottom3 | bottom6 | right8 | bottom2 (1 pixel) |
| 12 | bottom6 | bottom7 | right9 | bottom3 (1 pixel) |
| 13 | bottom7 | right pixel of bottom7 x4 | right12 | bottom6 (1 pixel) |

Table 3 above further illustrates sub-blocks associated with a first sequence of sub-blocks, which are associated with the first stream (stream 0). Generally, the intra 4×4 search module 68 of FIGS. 3b and 4 processes the sub-blocks of the first sequence of sub-blocks (0, 1, 4, 5, 8, 9, 12, 13) listed in Table 3, in ascending order as listed. With reference to FIG. 4 and Table 3, pixels used to process a given sub-block of the first sequence of sub-blocks are output from the first neighbor pixel selector 74 to the intra 4×4 search module 68 via the stream-partitioning MUX 80.

Similarly, Table 4 below illustrates sub-blocks associated with a second sequence of sub-blocks, which are associated with the second stream, (stream 1). Generally, the intra 4×4 search module 68 of FIGS. 3b and 4 processes the sub-blocks of the second sequence of sub-blocks (2, 3, 6, 7, 10, 11, 14) listed in Table 4, in ascending order as listed. With reference to FIGS. 4 and Table 3, pixels used to process a given sub-block of the second sequence of sub-blocks are output from the second neighbor pixel selector 78 to the intra 4×4 search module 68 via the stream-partitioning MUX 80.

TABLE 4

Stream 1

| | Pixels Used to Process Sub-Block | | | |
|---|---|---|---|---|
| Sub-Block Number | Pixels A, B, C, D | Pixels E, F, G, H | Pixels I, J, K, L | Pixel M |
| 2 | bottom0 | bottom1 | nleft2 | nleft3 (1 pixel) |
| 3 | bottom1 | bottom4 | right2 | bottom0 (1 pixel) |
| 6 | bottom4 | bottom5 | right3 | bottom1 (1 pixel) |
| 7 | bottom5 | right pixel of bottom5 x4 | right6 | bottom4 (1 pixel) |
| 10 | bottom8 | bottom9 | nleft0 | nleft1 (1 pixel) |
| 11 | bottom9 | bottom12 | right10 | bottom8 (1 pixel) |
| 14 | bottom12 | bottom13 | right11 | bottom9 (1 pixel) |

TABLE 4-continued

Stream 1

| | Pixels Used to Process Sub-Block | | | |
|---|---|---|---|---|
| Sub-Block Number | Pixels A, B, C, D | Pixels E, F, G, H | Pixels I, J, K, L | Pixel M |
| 15 | bottom13 | right pixel of bottom13 x4 | right14 | bottom12 (1 pixel) |

Note that when processing sub-blocks 7 and 15, the EFGH pixels are determined simply by replicating the D pixel four times.

Pixels associated with the first sequence of sub-blocks, i.e., that are part of the first stream (stream 0) and that are out from the intra 4×4 search module 68 of FIG. 4 are given in Table 5 below. In addition, processed pixels associated with the second stream (stream 1) that are input the neighbor pixel selector 64 of FIG. 4 are given in Table 5 below.

TABLE 5

| Stream 0 Sub-Block Number | Stream 0 Processed Pixels | | Stream 1 Sub-Block Number | Stream 1 Processed Pixels | |
|---|---|---|---|---|---|
| 0 | bottom0 | right0 | | | |
| 1 | bottom1 | right1 | | | |
| 4 | bottom4 | right4 | 2 | bottom2 | right2 |
| 5 | bottom5 | right5 | 3 | bottom3 | right3 |
| 8 | bottom8 | right8 | 6 | bottom6 | right6 |
| 9 | bottom9 | right9 | 7 | bottom7 | right7 |
| 12 | bottom12 | right12 | 10 | bottom10 | right10 |
| 13 | bottom13 | right13 | 11 | bottom11 | right11 |
| | | | 14 | bottom14 | right14 |
| | | | 15 | bottom15 | right15 |

In Table 5, the order in which a given sub-block is processed by the intra 4×4 search module 68 of FIGS. 3b and 4 is given by the position of the sub-block in the Table 5, such that sub-blocks listed earlier in the table are processed before sub-blocks listed later in the table. For example, the processing of sub-block 2 does not begin until sub-blocks 0 and 1 have been processed. Pairs of sub-blocks 4 and 2; 5 and 3; 8 and 6; 9 and 7; 12 and 10; and 13 and 11 are processed in parallel, such as in a pipelined fashion. Note that the first sequence of sub-blocks (SBs 0, 1, 4, 5, 8, 9, 12, 13) and the second sequence of sub-blocks (SBs 2, 3, 6, 7, 10, 11, 14, 15) may be altered without departing from the scope of the present teachings. For example, any sub-blocks of the above-identified pairs of sub-blocks may be switched to stream 0 or stream 1. For example, sub-block 2 may be positioned in place of sub-block 4 in stream 0, while sub-block 4 is positioned in place of sub-block 2 in stream 1.

With reference to FIGS. 4 and 6 and Tables 3 and 5 above, the intra 4×4 search module 68 uses four sequences of pixels, including a sequence of ABCD pixels, a sequence of EFGH pixels, a sequence of IJKL pixels and a sequence of M pixels. Note that the sequence of IJKL pixels in Table 3 may be obtained, at least in part, from the processed right pixels associated with stream 0 (st0) that are output from the intra 4×4 search module 68 of FIG. 4. The processed right pixels (right0, 1, 4, 5 . . . ) of stream 0 in Table 5 are processed before they are needed to be input to the intra 4×4 search module 68 as indicated in Table 3.

In addition, certain EFGH pixels (bottom3, 6, 7), ABCD pixels (bottom2, 3, 6, 7), and M pixels (bottom2, 3, 6) of stream 0 in Table 3 may be obtained from the processed bottom pixels (bottom2, 3, 6, 7 . . . ) of stream 1 as shown in Table 5. Note that certain EFGH pixels in Table 3 are subsequently used as ABCD pixels or M pixels.

The first neighbor pixel selector 74 of FIG. 4 is configured to output stream 0 as shown in Table 3 based on certain previously processed pixels shown in FIG. 5 and neighboring pixel information, such as ntop1, 2, 3, 4 pixels, nleft 1, 2, 3, and nc pixels. Hence, the first neighbor pixel selector 74 selectively combines a first portion (right0, 1, 4, . . . ) of the first stream (st0) and a second portion (bottom2, 3, 6, . . . ) of the second stream (st1) to facilitate outputting an updated stream 0 (st0) for use in the prediction of subsequent sub-blocks by the intra 4×4 search module 68.

Furthermore, note that certain bottom processed pixels (bottom0, 1, 4 . . . ) of stream 0, as shown in Table 5, are usable as the ABCD, EFGH, and M pixels for stream 1 as shown in Table 4. In addition, certain processed right pixels (right 2, 3, 6 . . . ) of stream 1, as shown in Table 5, are usable as the IJKL pixels for stream 1 as shown in Table 4. Note that certain EFGH pixels in stream 1 of Table 4 are subsequently usable as ABCD pixels and M pixels.

The second neighbor pixel selector 78 of FIG. 4 is configured to output stream 1 as shown in Table 4 based on certain previously processed pixels shown in FIG. 5 and neighboring pixel information, such as nleft1, 2, 3 pixels. Hence, the second neighbor pixel selector 78 selectively combines a first portion (bottom0, 1, 4, . . . ) of the first stream (st0) and a second portion (right2, 3, 6, . . . ) of the second stream (st1) to facilitate outputting an updated stream 1 (st1) for use in the prediction of subsequent sub-blocks by the intra 4×4 search module 68.

Figure 8:
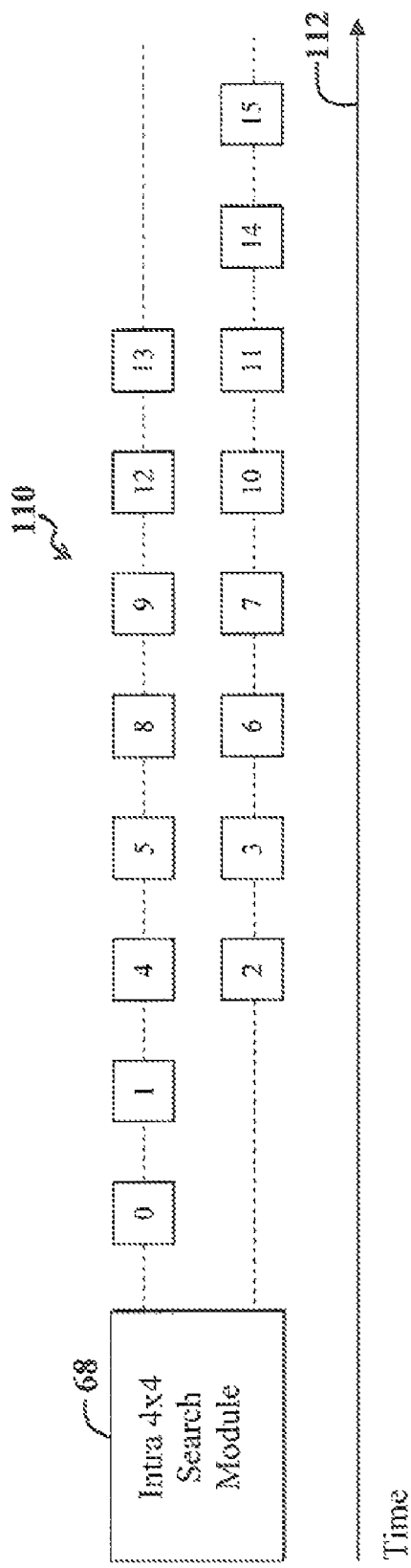
FIG. 8 is a first example timing diagram illustrating a first example of when certain sub-blocks of the example macroblock of FIGS. 5-7 are processed by the intra macroblock processors of FIGS. 2-4.

FIG. 8 is a first example timing diagram 110 illustrating a first example of when certain sub-blocks (SBs 0→15) of the example macroblock 102 of FIGS. 5-7 are processed by the intra macroblock processors 60, 60' of FIGS. 2-4. Approximate example processing intervals for the SBs 0→15 are plotted along a horizontal time axis 112.

With reference to FIGS. 3-7 and Tables 1-5 above, in one operative scenario, the pipelined engine, i.e., the intra 4×4 search module 68, processes SBs 0, 1, 4, 5, 8, 9, 12, and 13 of a first sequence and SBs 2, 3, 6, 7, 10, 11, 14, and 15 of a second sequence. After the intra 4×4 search module 68 processes SB0 and SB1, the intra 4×4 search module 68 begins processing the following pairs of sub-blocks in parallel, in a pipelined fashion: SB4 and SB2, SB5 and SB3, SB8 and SB6, SB9 and SB7, SB12 and SB10, SB13 and SB11. Note that by the time any given sub-block is processed, the pixels of the other sub-blocks used to process the given sub-block have already been processed. Hence, by capitalizing on the sub-block processing dependencies and the ordering of sub-blocks within a macroblock, efficient parallel processing of sub-blocks is achieved.

The timing diagram 110 of FIG. 8 is merely illustrative and is not shown to scale. For example, while, in FIG. 8, the processing of sub-blocks of the above-identified pairs is shown directly coinciding in time, in practice, the processing intervals are slightly offset during pipelining, since, for example, SB4 is fed into the pipeline slightly behind SB2 or vice versa.

While in the present embodiment, the intra 4×4 search module 68 is implemented as a pipelined processor, the intra 4×4 search module 68 may be implemented as two parallel processors or engines without departing from the scope of the present teachings. In such an implementation, the processing of sub-blocks of the above-identified pairs of sub-blocks may directly coincide.

Note that during pipelining, SB2 is fed into the pipelined processor, i.e., the intra 4×4 search module 68, directly behind SB4 so that the pipelined processors 60, 60' of FIGS. 2-4 begin processing SB2 before the processing of SB4 is complete. Alternatively, the pipelined processor 68 of FIG. 3b begins processing SB2 just before it begins processing SB4. Either way, the processing of SB2 and 4 by the pipelined processor 68 overlap so that parallel processing is achieved. Similarly, the other pairs of sub-blocks (SB5 and SB3, SB8 and SB6, SB9 and SB7, SB12 and SB10, SB13 and SB11) are processed by the pipelined processor 68 in a pipelined fashion.

Figure 9:
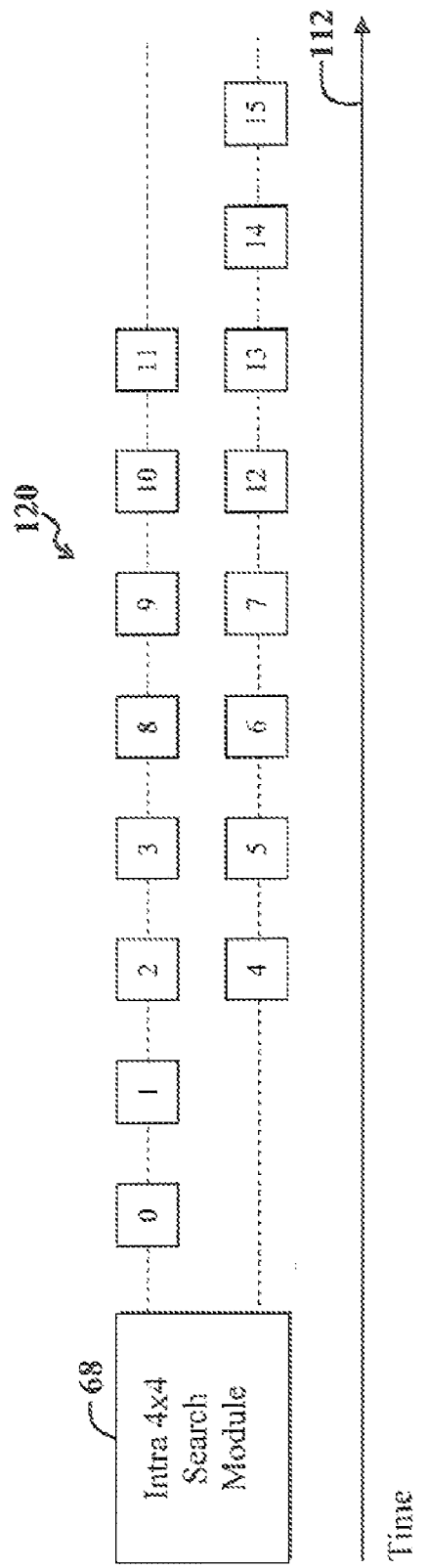
FIG. 9 is a second timing diagram illustrating a second example of when certain sub-blocks of an example macroblock of FIGS. 5-7 are processed by the-intra macroblock processors of FIGS. 2-4.

FIG. 9 is a second timing diagram 120 illustrating a second example of when certain sub-blocks (SBs 0→15) of the macroblock 102 of FIGS. 5-7 may be processed by the intra macroblock processors 60, 60' of FIGS. 2-4. Processing intervals for the SBs 0→15 are plotted along the horizontal time axis 112. The timing diagram 120 of FIG. 9 is similar to the timing diagram of FIG. 8 with the exception that the first sequence of sub-blocks (SBs 0, 1, 2, 3, 8, 9, 10, 11) in FIG. 9 is altered relative to the corresponding sequence in FIG. 8. Similarly, the second sequence of sub-blocks (SBs 4, 5, 6, 7, 12, 13, 14, 15) is altered relative to the corresponding sequence in FIG. 8. Accordingly, the following pairs of sub-blocks are processed in parallel by the pipelined processor 68 of FIG. 4: SB2 and SB4, SB3 and SB5, SB6 and SB8, SB7 and SB9, SB10 and SB12, SB11 and SB13.

Figure 10:
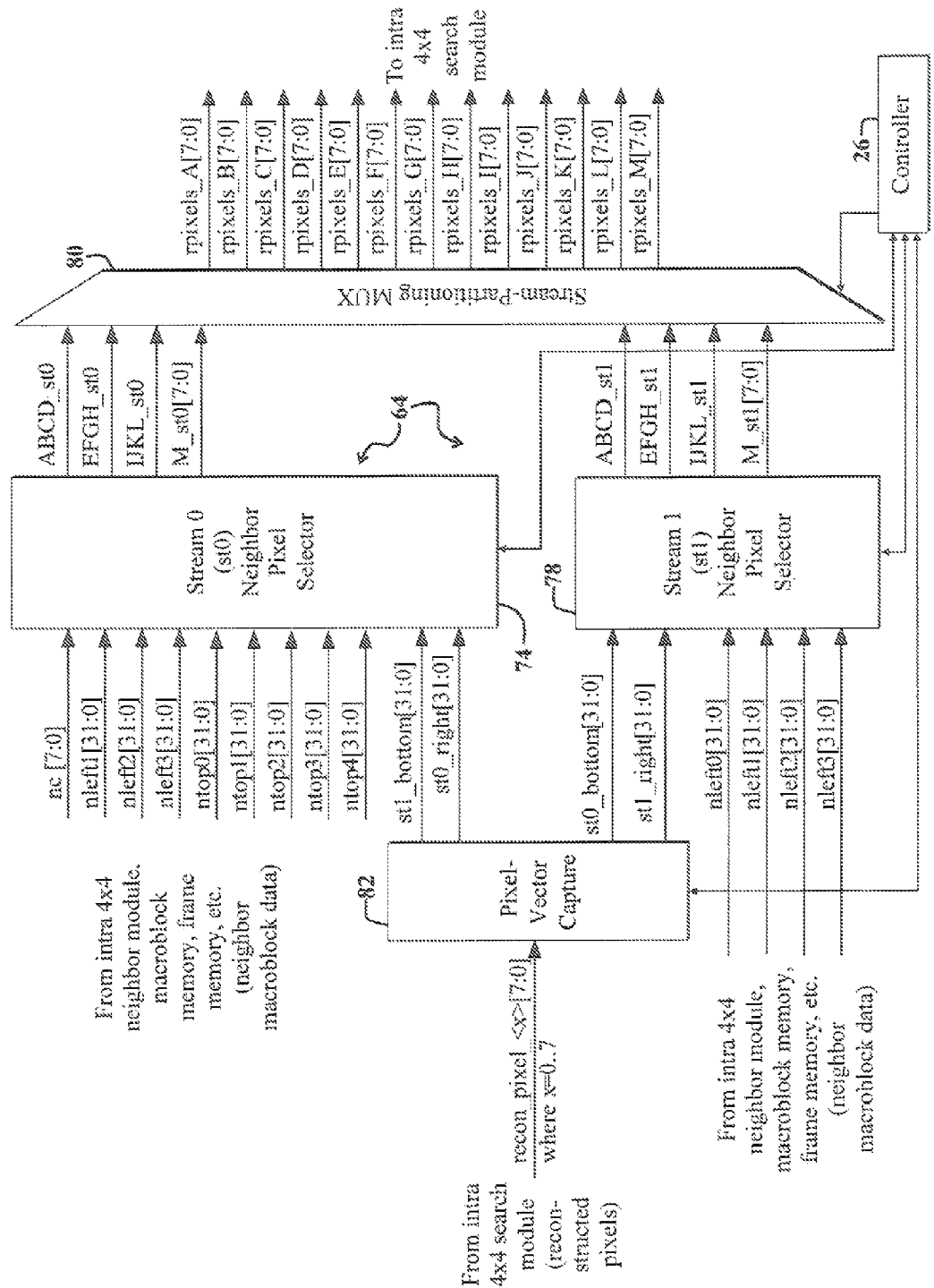
FIG. 10 is a more detailed diagram illustrating example inputs and outputs of the neighbor pixel selectors and stream-partitioning MUltipleXer (MUX) of FIG. 4.

FIG. 10 is a more detailed diagram illustrating example inputs and outputs of the neighbor pixel selectors 74, 78 and stream-partitioning MUX 80 of FIG. 4. An additional pixel-vector capture module 82 is shown providing stream 0 (st0) and stream 1 (st1) outputs to the first neighbor pixel selector 74 and the second neighbor pixel selector 78. The pixel-vector capture module 82 may be implemented within the intra 4×4 search module 68 of FIG. 4.

The pixel-vector capture module 82 receives a stream of reconstructed pixels (labeled recon_pixel_x, where x is an integer between 0 and 7) and selectively outputs portions of st0 and st1 in parallel to the neighbor pixel selectors 74, 78. For example, the pixel-vector capture module 82 outputs the processed bottom pixels of st1 (st1_bottom) and the processed right pixels of st0 (st0_right), as shown in Table 5, to the first neighbor pixel selector 74 in response to an appropriate control signal from the controller 26. Similarly, the pixel-vector capture module 82 outputs the processed bottom pixels of st0 (st0_bottom) and the processed right pixels of st1 (st1_right), as shown in Table 5, to the second neighbor pixel selector 78 in response to an appropriate control signal from the controller 26.

The first neighbor pixel selector 74 receives various pixels associated with one or more previously processed neighboring macroblocks (n-pixels), including the eight-bit corner pixel (nc). nleft1, nleft2, nleft3, ntop0, ntop1, ntop2, ntop3, and ntop4. These pixels are received from the intra 4×4 search module 68 or from another memory or processor that handles or otherwise stores results associated with processed macroblocks. Note that the neighboring pixels input to the first neighbor pixel selector 74, the processed st1 bottom pixels, and the processed st0 right pixels, are used by the neighbor pixel selector 74 to output the updated st0 pixels in accordance with Table 3 above. The updated st0 pixels include ABCD pixels (ABCD_st0), EFGH pixels (EFGH_st0), IJKL pixels (IJKL_st0), and M pixels (M_st0) associated with st0. The first output stream (st0) is input to the stream-partitioning MUX 80.

Similarly, the second neighbor pixel selector 78 receives neighboring pixel information, such as nleft0, nleft1, nleft2, and nleft3 pixels, from one or more neighboring macroblocks. Various neighboring pixels are shown in FIGS. 6 and 7.

The neighboring pixels input to the first neighbor pixel selector 78 in combination with the processed st0 bottom pixels and st1 right pixels are employed by the second neighbor pixel selector 78 to provide the updated st1 pixels as indicated in Table 4 above. The updated st1 pixels, include ABCD pixels (ABCD_st1), EFGH pixels (EFGH_st1), IJKL pixels (IJKL_st1), and M pixels (M-st1) associated with st1. The second output stream (st1) is also input to the stream-partitioning MUX 80.

The stream-partitioning MUX 80 receives st0 pixels and st1 pixels in a particular format or grouping from the first neighbor pixel selector 74 and the second neighbor pixel selector 78, respectively, and reformats them as needed, to provide pixels A-M for st0 and st1 on individual output lines for use by the intra 4×4 search module 68 of FIGS. 3b and 4.

Timing and control of operational modes and behaviors of the various modules 74, 78, 80, 82 of FIG. 10 are governed by a state machine implemented by the controller 26, as discussed more fully below.

In the present example embodiment, a pixel is defined via eight bits ([7:0]) of information. Accordingly, a group of four pixels, such as bottom0 pixels output from the pixel-vector capture module 82 are described by thirty-two bits ([31:0]). Note that different pixel, resolutions (e.g., 10, 12, 16, or 24 bits per pixel) may be employed to encode pixels without departing from the scope of the present teachings.

Figure 11:
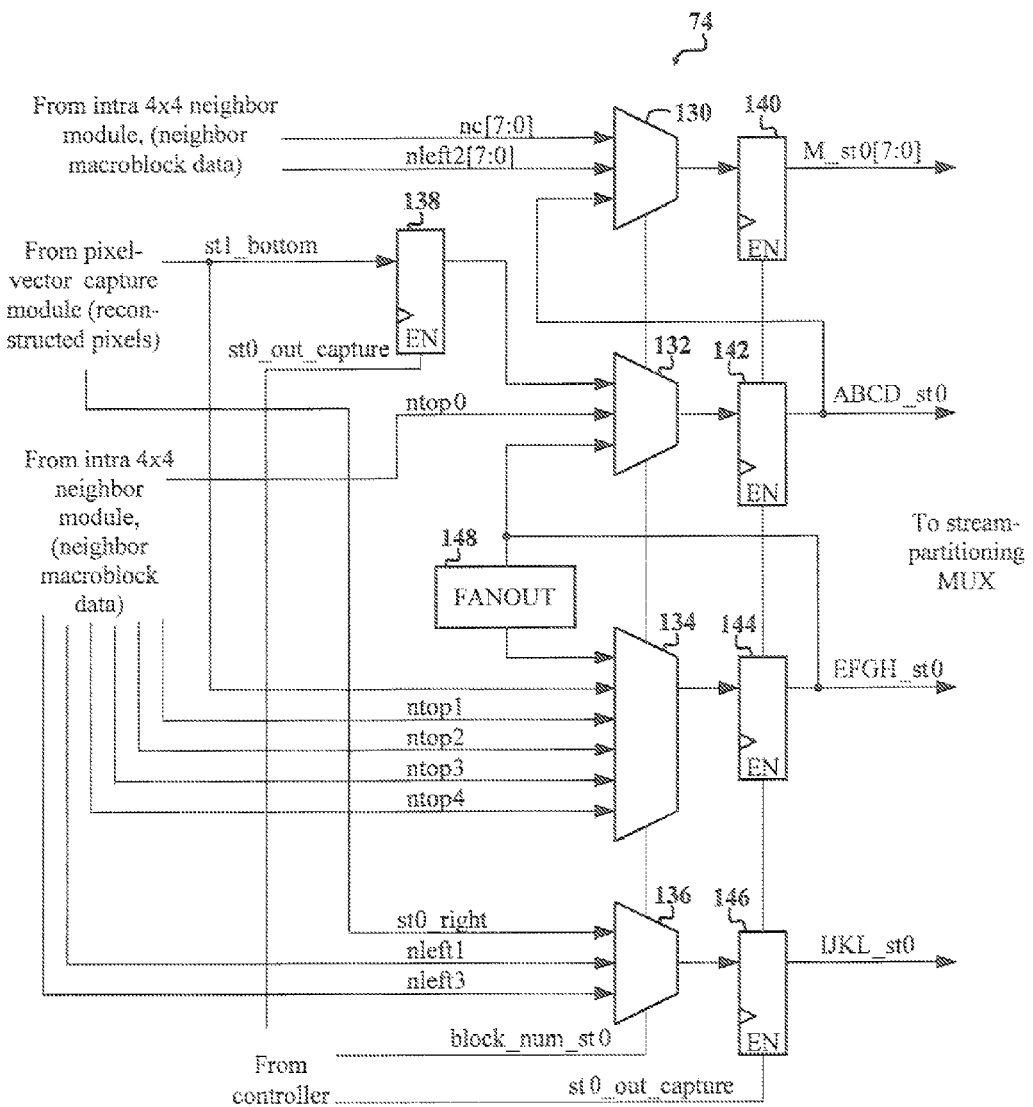
FIG. 11 is a more detailed diagram of the first neighbor pixel selector of FIG. 4.

FIG. 11 is a more detailed diagram of the first neighbor pixel selector 74 of FIG. 4. With reference to FIGS. 10 and 11, the first neighbor pixel selector 74 includes a first MUX 130, a second MUX 132, a third MUX 134, and a fourth MUX 136, which are controlled by a stream 0 block-number input (block_num_st0) from the controller 26 of FIG. 10. Outputs of the MUXs 130-136 are input to corresponding registers 140-146, the outputs of which are selectively clocked or enabled by a stream 0 output-capture signal (st0_out_capture) from the controller 26, Output from the first register 140 represents M pixels (M_st0) associated with st0, as indicated in Table 3 above. Neighboring pixels, one pixel from each of the neighboring groups of pixels ntop0, ntop1, ntop2, and nleft2, and one pixel from each group of bottom pixels bottom 2, bottom 3, and bottom 6, are obtained from the ABCD pixels of stream 0, as indicated in Table 3 above and in FIG. 11. Output of the second register 142 represents ABCD pixels (ABCD_st0); output from the third register 144 represents EFGH pixels (EFGH_st0); and output from the fourth register 146 represents IJKL pixels (IJKL_st0) associated with the first stream st0.

The first MUX 130 receives corner pixels (nc), nleft2 pixels, and ABCD_st0 pixels output from the second register 142 as input outputs M_st0 to the first register 140 in response to the appropriate control signal (block_num_st0) from the controller 26.

A fifth register 138 receives st1_bottom pixels as input and forwards the st1_bottom pixels to the second MUX 132 in response to a stream 0 output-capture signal (st0_out_capture) signal from the controller 26. The second register 132 also receives ntop0 pixels and EFGH pixels output from the third register 144 as input and provides ABCD pixels to the second register 142 in response to an appropriate control signal (st0_out_capture) from the controller 26.

A fanout module 148 is coupled between the output of the third register 144 and an input to the third MUX 134. The fanout module 148 replicates the right bottom7 pixel four times for use in processing SB 13 for each macroblock, as indicated in Table 3 above. The right bottom7 pixel is obtained from the output of the third register 144. The third MUX 134 also receives various neighboring pixels, including ntop1, ntop2, ntop3, and ntop4 as input. These neighboring pixels are used to construct the EFGH pixels for stream 0, as indicated in Table 3 above.

The fourth MUX receives processed right pixels for stream 0 (st0_right) as indicated in Table 5 above, and receives nleft1, and nleft3 pixels for use in providing IJKL pixels for stream 0 (IJKL_st0) as indicated in Table 3 above.

The operation of the first neighbor pixel selector 74 of FIG. 11 should be clear with reference to FIG. 11, Table 5, and Table 3 above. Outputs of the first neighbor pixel selector 74 are listed in Table 3 and are derived in part from the st0 and st1 sequences of processed pixels in Table 5. The various components, including the MUXs 130-136, registers 140-148, and fanout 148 are employed to selectively generate the contents as shown in Table 3 based on input as shown in Table 5 and neighboring sub-block input. The neighboring sub-block input may be obtained from memory within the intra 4×4 neighbor module 62 or intra 4×4 search module 68 of the intra macroblock processors 60, 60' of FIGS. 2-4.

Figure 12:
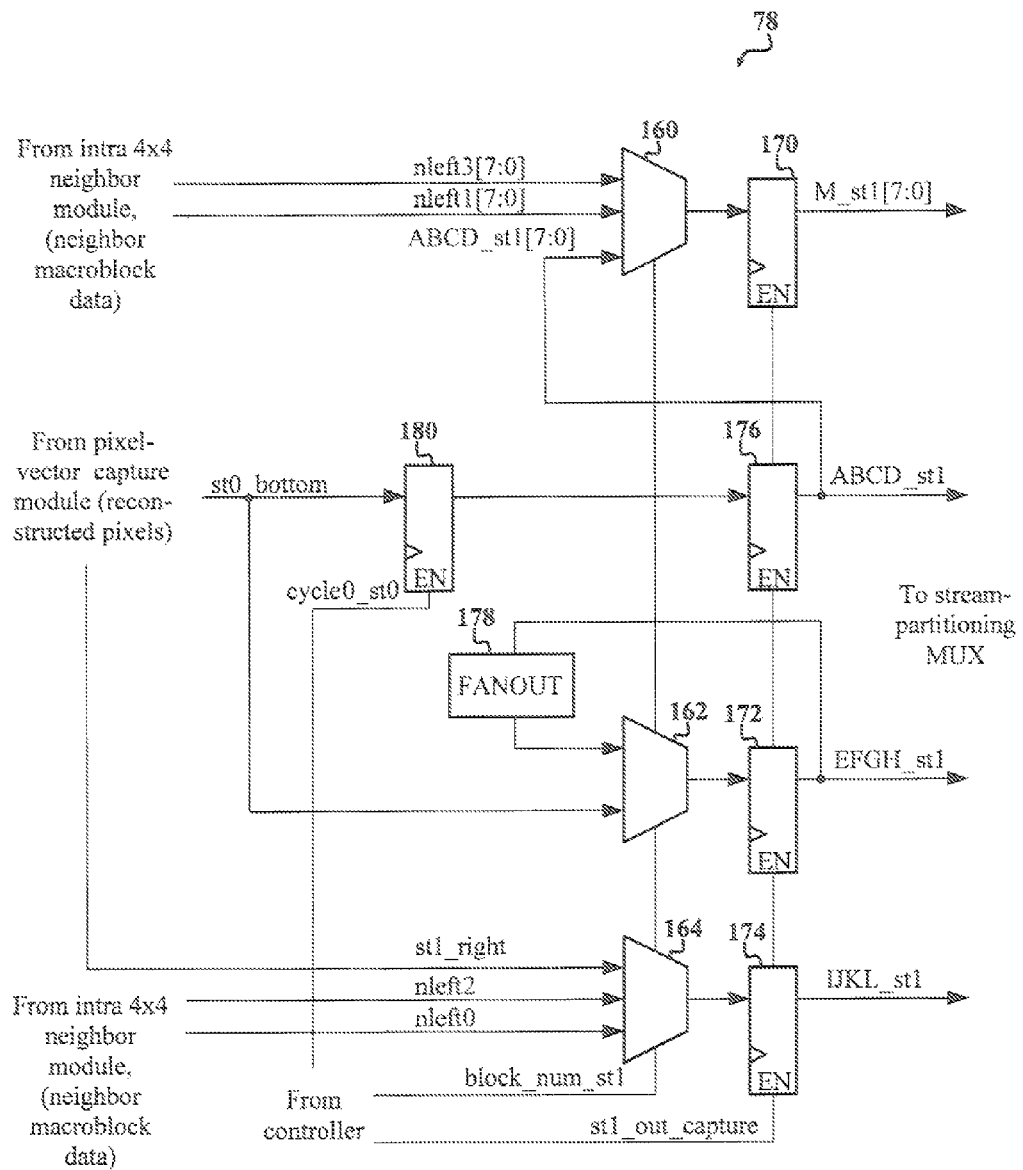
FIG. 12 is a more detailed diagram of the second neighbor pixel selector of FIG. 4.

FIG. 12 is a more detailed diagram of the second neighbor pixel selector 78 of FIG. 4. The second neighbor pixel selector 78 includes a top MUX 160, a middle MUX 162, and a bottom MUX 164, which provide output to a top register 170, a first middle register 172, and a bottom register 174. A second middle register 176 receives input from a third middle register 180.

With reference to FIGS. 10 and 12 and Tables 4 and 5, the top register 160 receives certain neighboring pixels, namely, nleft 3 and nleft 1 pixels, and receives ABCD pixels associates with stream 1 (ABCD_st1) as input and provides M pixels for stream 1 (M_st1) as output to the top register 170. The top register 170 is selectively clocked or enabled by an appropriate control signal (st1_out_capture) from the controller 26 of FIG. 10. The ABCD_st1 pixels input to the top MUX 160 are received from the second middle register 176.

The output of the second middle register 176 represents ABCD pixels for stream 1 (ABCD_st1) as indicated in Table 4 above. The output of the middle register 172 represents EFGH pixels for stream 1, as indicated in Table 4 above. Similarly, the output of the bottom register 174 represents IJLK pixels for stream 1 (IJLK_st1) as indicated, in Table 4 above.

The middle MUX 162, which facilitates forming the EFGH_st1 pixels of Table 4 receives output from a second fanout module 178, which is coupled between the output of the middle register 172 and an input of the middle MUX 162. The second fanout module 178 replicates the right bottom5 pixel four times to facilitate SB7 processing and replicates the right bottom13 pixel four times to facilitate SB15 processing. Note that in Table 4, the EFGH pixels may be obtained from the processed bottom pixels of stream 0 (st0_bottom) as shown in Table 5. Note that the processed st0_bottom pixels are also input to the third middle register 180 and selectively forwarded to the second middle register 176 in response to a cycle0_st0 control signal from the controller 26. The bottom MUX 164 receives processed right pixels from stream 1 (st1_right) as shown in Table 5, and receives nleft2 and nleft0 neighboring pixels, as needed to obtain the IJKL pixels (IJKL_st1) as shown in Table 4.

The operation of the second neighbor pixel selector 78 of FIG. 12 should be clear with reference to FIG. 12, Table 5, and Table 4 above. Outputs of the second neighbor pixel selector 74 are listed in Table 4 and are derived in part from the st0 and st1 sequences of processed pixels in Table 5. The various components 160-180 are employed to selectively generate the contents as shown in Table 4 based on input as shown in Table 5 and neighboring sub-block input. The neighboring sub-block input may be obtained from memory within the intra 4×4 neighbor module 62 or intra 4×4 search module 68 of the intra macroblock processors 60, 60' of FIGS. 2-4.

The timing, modes, and operation of the components 160-180 of the second neighbor pixel selector 78 are controlled by a state machine running on the controller 26 of FIG. 10. For example, the controller 26 controls the MUXs 162-164 via a block_num_st1 control signal; controls the registers 170-176 via an st1_out_capture control signal, and controls the third middle register 180 via a cycle0_st0 control signal. Such control signals are discussed more fully below.

Figure 13:
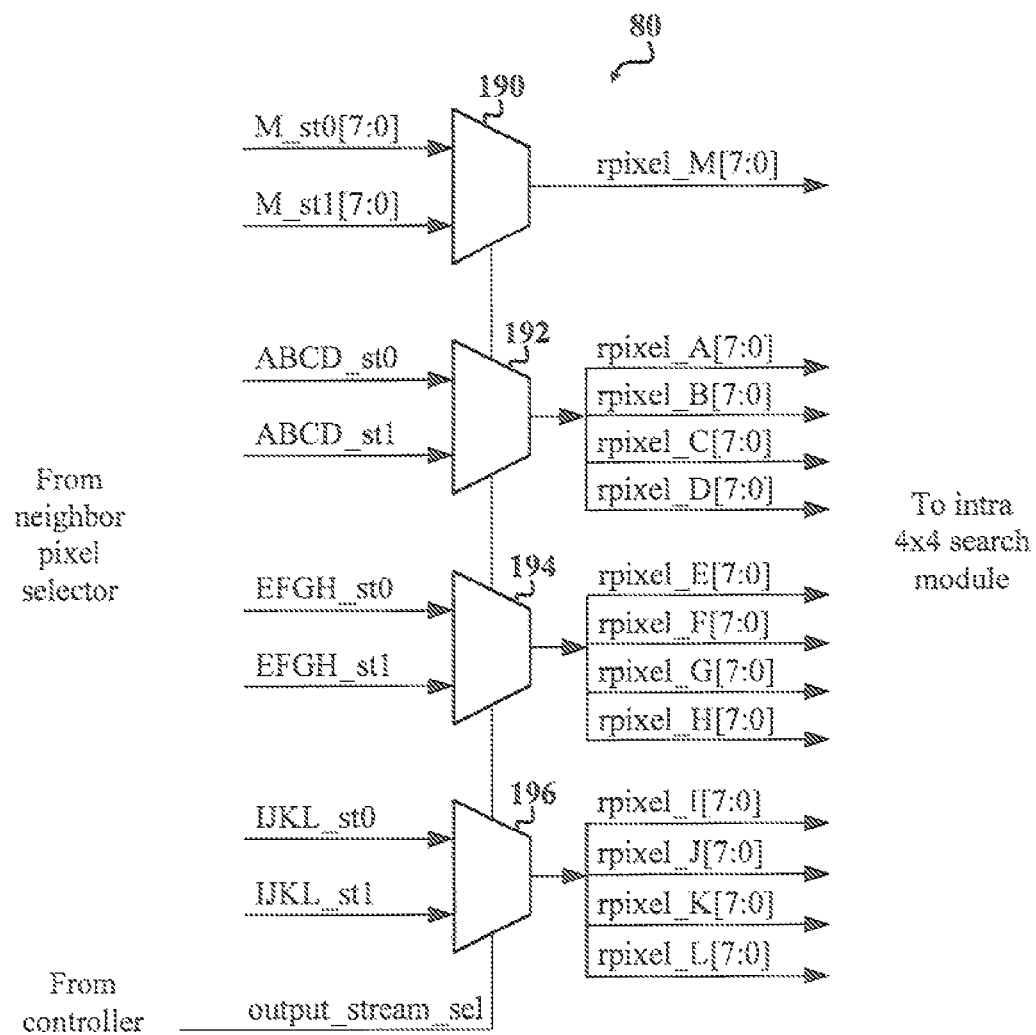
FIG. 13 is a more detailed diagram of the stream-partitioning MUX of FIG. 10.

FIG. 13 is a more detailed diagram of the stream-partitioning MUX 80 of FIG. 10. The stream-partitioning MUX 80 includes four sub-MUXs, including a first sub-MUX 190, a second sub-MUX 192, a third sub-MUX 194, and a fourth sub-MUX 196. The sub-MUXs 190-196 are controlled via an output-stream selection control signal (output_stream_sel) from the controller 26 of FIG. 10. The first sub-MUX 190 receives M pixels associated with the first stream (M_st0), and M pixels associated with the second stream (M_st1) on separate eight-bit inputs and outputs individual M-pixel values on an eight-bit M-pixel output (rpixel_M) in response to an appropriate control signal.

The second sub-MUX 192 receives ABCD pixels (AB-CD_st0) for the first stream (stream 0 (st0)) and ABCD pixels (ABCD_st1) for the second stream (stream 1 (st1)) and selectively outputs four individual eight-bit pixel busses (rpixel_A, rpixel_B, rpixelC, rpixel_D) for the ABCD pixels for st0 and st1.

Similarly, the third sub-MUX receives st0 EFGH pixels (EFGH_st0) and st1 EFGH pixels (EFGH_st1) and selectively outputs four individual eight-bit pixel busses (rpixel_E, rpixel_F, rpixel_G, rpixel_H) for the EFGH pixels for st0 and st1.

Similarly, the fourth sub-MUX 196 receives st0 IJKL pixels (IJKL_st0) and st1 IJKL pixels (IJKL_1) and selectively outputs four individual eight-bit pixel busses (rpixel_I, rpixel_J, rpixel_K, rpixel_L) for the IJKL pixels for st0 and st1.

Hence, the stream-partitioning MUX 80 is used to select between st0 and st1 neighbor pixels. The stream-partitioning MUX 80 also breaks out the larger pixel group bases (ABCD_st0, ABCD_st1, etc.) into the individual pixel buses (rpixel_A, rpixel_B, rpixelC, rpixel_D, etc.) as needed.

Figure 14:
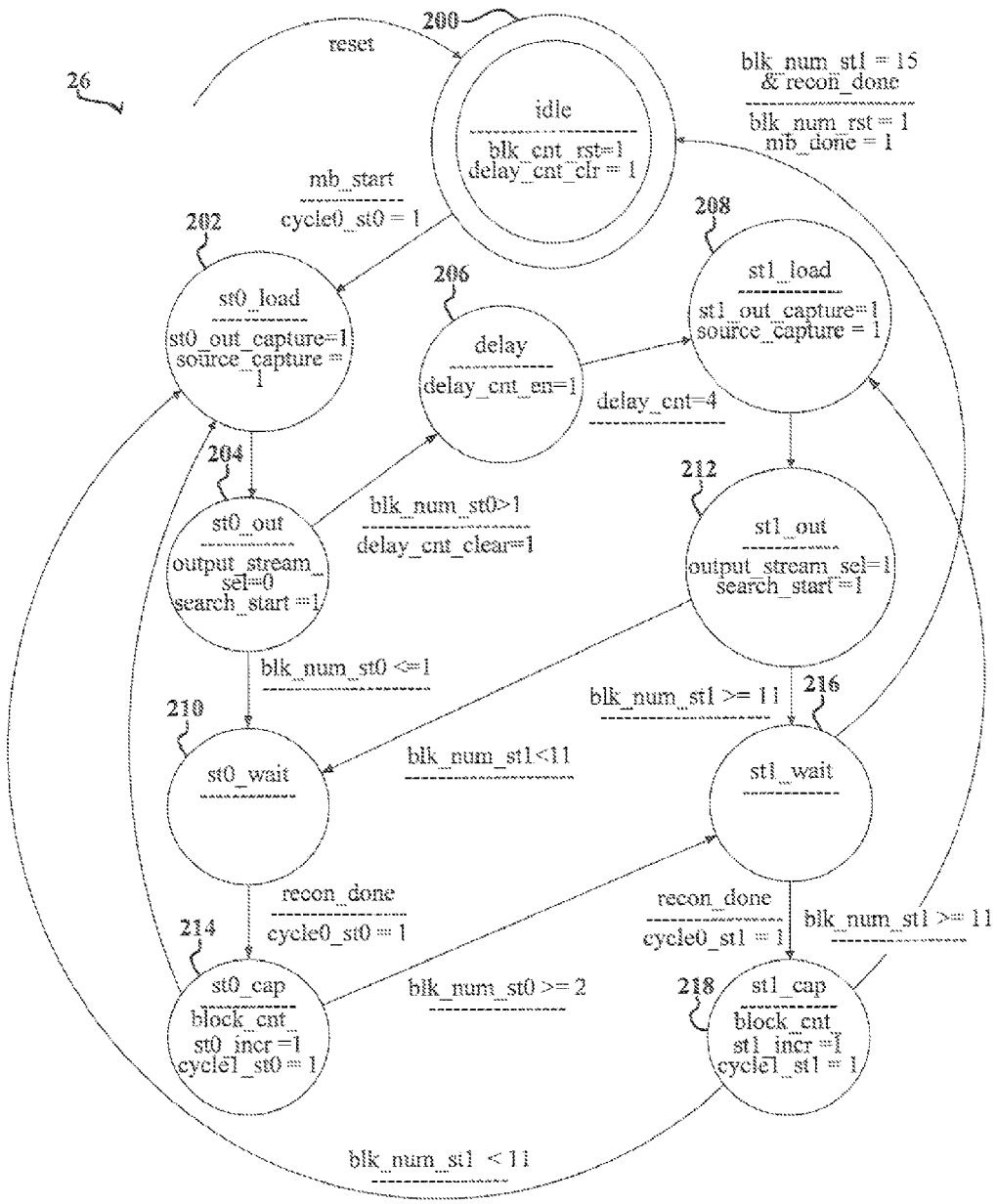
FIG. 14 is a diagram of a state machine implemented by the controller of FIGS. 1-4.

FIG. 14 is a diagram illustrating a state machine 26 corresponding to the controller 26 of FIGS. 1-4. The state machine 26 is also called a neighbor pixel sequencer. The state machine 26 includes various states 200-218, which determine various output control signals shown in the embodiments of FIGS. 10-14. The states are transitioned when certain conditions are met.

In FIG. 14, the names of each state occur above a horizontal line in each state. Example values of specific output signals of the controller 26 when the controller 26 is in the given state are indicated below each horizontal line. Similarly, each transition between states is identified by a condition that causes the given transition above a horizontal line, and certain control signal values established during each transition are indicated below the horizontal line for each transition.

The states include an idle state 200, an st0_load state 202, an st0_out state 204, a delay state 206, a st1_load state 208, an st0_wait step 210, an st0_out step 212, an st0_capture (st0_cap) state 214, an st1_wait step 216, and an st1_capture (st1_cap) state 218.

In operation, the state machine 26 facilitates processing sub-blocks of a macroblock approximately as shown in FIG. 8. Hence, SBs 0 and 1 are processed before SB4. SB2 and 4 are processed in a pipelined fashion, and so on. At certain times during processing, the loading of st1 is delayed (e.g., delay state 206); the capturing of st0 is delayed (e.g., st0_wait state 210); the capturing of st1 is delayed (st1_wait state 216); and the setting of corresponding control signals is selectively delayed. With reference to FIGS. 8 and 14, for example, the loading of data used to process st1 is delayed until SBs 0 and 1 are processed in st0. Note that SBs 0, 1, 4, 5, 8, 9, 12, and 13 correspond to st0, and SBs 2, 3, 6, 7, 10, 11, 14, and 15 correspond to st1, as indicated in Tables 3 and 4 above.

The idle state 200 is entered when the controller 26 is reset or when the controller transitions from the st1_wait state 216. The controller 26 transitions from the st1_wait state 216 to the idle state 200 when the sub-block number associated with st1 is 15 (blk_num_st1=15) and when pixel reconstruction is done, as indicated by a pixel-reconstruction. flag (recon_done). When in the idle state 200, a block-counter reset flag is set to 1 (blk_counter_rst=1) and a delay-counter clearing flag is set to 1 (delay_cnt_clr=1) so that the block counter is cleared and the delay counter is reset. Certain modules, such as modules for generating certain signals, such as block counters and delay counters, which may be implemented via 3-bit counters, are not shown in FIG. 14. However, those skilled in the art with access to the present teachings will know which components to implement and how to implement them to meet the needs of a given application without undue experimentation.

The controller 26 transitions from the idle state 200 to the st0_load state 202 to begin loading st0 pixel information when a start flag (mb_start) is set. The mb_start flag may be set when the controller 26 detects that information required to process SB 0 is available. Exact details of mechanisms for determining when a SB 0 is ready for loading are application specific and may be determined by those skilled in the art without undue experimentation. During the transition from the idle state 200 to the st0_load state 202, a cycle counter value for st0 is set to 1 (cycle0_st0=1).

Subsequently, during the st0_load state 202, the st0_out_capture control signal is set to 1, and an source_capture flag is set to 1. The st0_out_capture control signal triggers the registers 138-146 for the first neighbor pixel selector 74 shown in FIG. 11. After st0_out_capture and source_capture are appropriately set, the controller transitions to the st0_out state 204.

In the st0_out state 204, an output-stream selection control signal (output_stream_sel) is set to 0, and a search-start flag is set to 1 (search_start=1). The output_stream_sel signal controls the sub-MUXs 190-196 of the stream-partitioning MUX 80 of FIG. 13. The search_start flag affects enables the intra 4×4 search module 68 of FIG. 4 to start the intra prediction process, also called the search process.

From the st0_out state 204, the controller 26 may transition to the delay state 206 or the st0_wait state 210, depending on which conditions are met. If the current sub-block number associated with st0 is greater than one (blk_num_st0>1), then the controller 26 clears the delay counter (delay_cnt_clear=1), and enters the delay state 206, where the delay counter is enabled (delay_cnt_en=1). Otherwise, if blk_num_st0<1, then the controller 26 enters the st0_wait state 210.

The controller 26 transitions from the delay state 206 to the st1_load state 208 when the delay counter reaches 4 (delay _cnt=4). When in the st1_load state 208, the controller sets the output-capture control signal for st1 to 1 (st1_out_capture=1) and sets the source-capture flag to 1

(souce_capture=1). The st1_out_capture control signal controls the output registers 170-174 of the second neighbor pixel selector 78 of FIG. 12.

Subsequently, after st1_out_capture and source capture are set in the st1_load state 208, the controller transitions to the st1_out state 212. In the st1_out state 212, an output-stream selection signal is set to 1 (output_stream_sel=1), and a search-start flag is set to 1 (search_start=1).

The controller 26 transitions from the st1_out state 212 to the st0_wait state if the current sub-block number associated with st1 is less than eleven (blk_num_st1<11). Otherwise, if blk_num_st1>=11, then the controller 26 transitions from the st1_out state 212 to the st1_wait state 216.

The controller 26 transitions from the st0_wait state 210 to the st0_cap state 214 when a reconstruction flag (recon_done) is set, indicating that certain pixel reconstruction has been completed. During the transition, a cycle counter for st0 is set to one (cycle0_st0=1).

In the st0_cap state 214, the block counter associated with st0 is periodically incremented by 1 via a block counter (block_cnt_st0_incr=1) and a cycle 1 flag for st0 is set to one (cycle1_st0=1), indicating that cycle 1 is underway. The controller 26 transitions from the st0_cap state 214 to the st1_wait state 216 when the block number associated with st0 is greater than or equal to two (blk_num_st0>=2). Note that the value of the blk_num_st0 acts as a control signal for controlling the MUXs 130-136 of the first neighbor pixel selector 74 of FIG. 11. Similarly, blk_num_st1 acts as a control signal for controlling the MUXs 160-164 of the second neighbor pixel selector 78 of FIG. 12.

The controller 26 transitions from the st1_wait state 216 to the st1_cap state 218 when the current sub-block number associated with st1 is greater than or equal to eleven (blk_num_st1>=11). During the transition, the reconstruction flag indicating that certain pixel reconstruction is complete is set (recon_done), and the cycle0_st1 flag is set to one (cycle0_st1=1).

During the st1_cap state, the block counter associated with st1 is periodically incremented by 1 (block_cnt_st1_incr=1), and the cycle_st1 flag is set to one (cycle1_st1=1). The controller 26 transitions from the st1_cap state 218 to the st0_load state 202 when blk_num_st1<11, and transitions to the st1_load state 208 when blk_num_st1>=11.

Hence, the controller 26, i.e., neighbor pixel sequencer, generates control signals required for operating the neighbor pixel selector 64 and accompanying components 74, 78 of FIGS. 4 and 10-12 and for the stream-partitioning MUX 80 as shown in FIGS. 4, 10, and 13.

In the present example embodiment, in addition to the state machine illustrated in FIG. 14, the controller 26 includes two 3-bit counters to track the sub-block number currently being processed by each stream (st0 and st1). Associated counter values are converted to the actual sub-block number being processed by each stream through a mapping operation, which may be implemented in hardware or software by those of ordinary skill in the art, without undue experimentation. The controller 26 also contains a 3-bit delay counter used to create a sufficient delay between assertions of search_start signal. The controller 26 may also include additional modules, such as logic modules for decoding the current block number (block_num) to control the selection inputs of various MUXs in the two stream pixel selectors 74, 78 of FIGS. 4, and 10-12 and stream-partitioning MUX 80 of FIGS. 4, 10, and 13 according to Tables 3 and 4.

Hence, the controller 26 may be considered an apparatus that exhibits a first operational mode (202, 204, 210, 214) associated with a first stream of data (st0), wherein the first stream of data is associated with a first sequence of sub-blocks (SBs 0, 1, 4, 5, 8, 9, 12, 13). A second operational mode (208, 212, 216, 218) is associated with a second stream of data (st1), wherein the second stream of data is associated with a second sequence of sub-blocks (SBs 2, 3, 6, 7, 10, 11, 14, 15). A processor for facilitating implementing the controller 26 executes one or more instructions included in the controller 24 for causing the first operational mode (202, 204, 210, 214) to switch to the second operational mode (208, 212, 216, 218) and to generate a control signal (e.g., st1_out_capture=1, output_stream_sel=1, etc.) in response thereto. The control signal is adapted to cause a selector, such as the neighbor pixel selector 64 of FIG. 4, to output a portion of the first stream (st0) or to output a portion of the second stream (st1) based on a block number associated with a sub-block of the first sequence or the second sequence.

Alternatively, the controller 26 may be considered an apparatus that implements one or more instructions for determining a block number of a sub-block, wherein the sub-block is associated with a first stream or a second stream, and providing a first indication (e.g., st0_load, st1_load, etc.) in response thereto; and then generating one or more control signals (e.g., st0_out_cap, block_num_st0, st1_out_cap, block_num_st1, etc.) to control output of a third stream (e.g., st0) or fourth stream (e.g., st1) from a pixel selector (e.g., neighbor pixel selector 64) based on the operational mode and the first indication.

Figure 15:
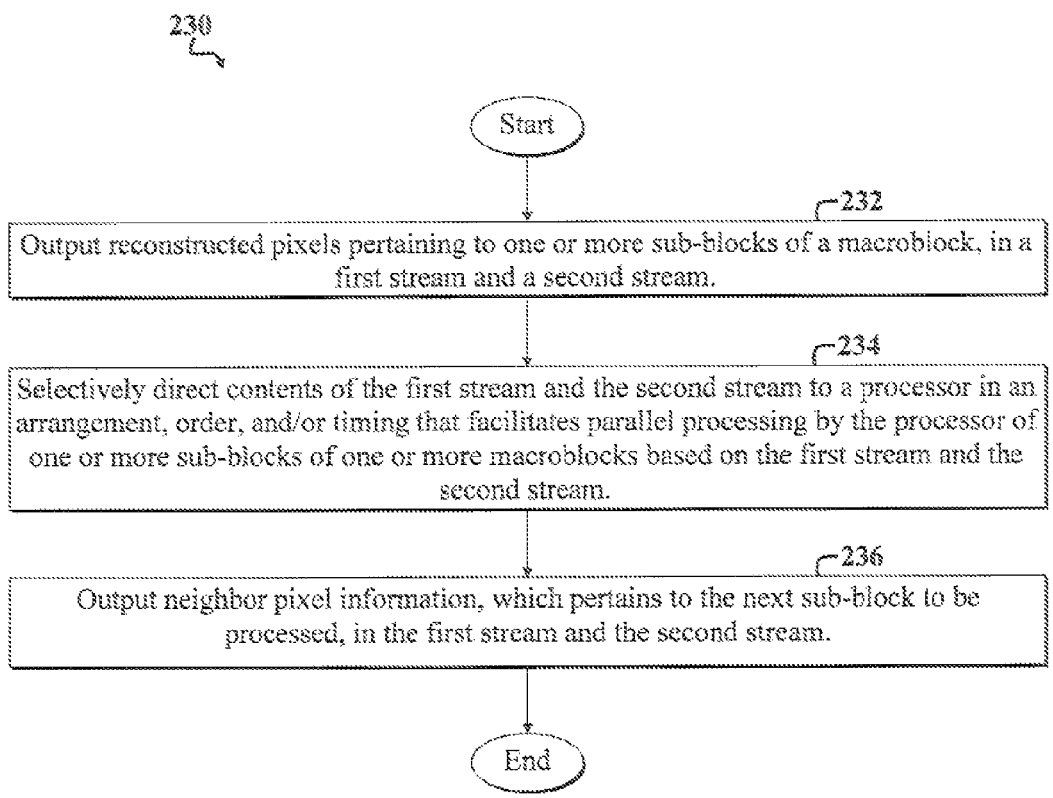
FIG. 15 is a flow diagram of a method usable with the embodiment of FIGS. 1-4.

FIG. 15 is a flow diagram of a method 230 usable with various embodiments disclosed herein, such as the embodiment depicted in FIG. 4. The method 230 includes a first step 232, which includes outputting reconstructed pixel information pertaining to a sub-block of a macroblock. The pixel information is output in a first stream (st0) and a second stream (st1).

Subsequently, a second step includes selectively directing contents of the first stream and the second stream to a processor, such as the intra 4×4 search module 68 of FIG. 4. The contents are directed in an arrangement, order, and/or timing that facilitates parallel processing of one or more sub-blocks of the one or more macroblocks based on the first stream and the second stream.

A subsequent third step 236 includes outputting newly processed pixel information, representing neighbor pixel information for a subsequent sub-block to be processed, via the first stream and the second stream. The method 230 then completes.

For the purposes of the present discussion, neighbor pixel information may be any information pertaining to pixels of a sub-block that are adjacent to a given sub-block. Reconstructed pixel information may be any information or data pertaining to a pixel that has been compressed and then decompressed or otherwise operated on by a function and then subsequently operated on by an inverse of the function. For example, pixel data that has been subtracted from an original representation of the pixel data, then transformed, quantized, dequantized, inverse transformed, and then added to the original representation, may be considered a type of reconstructed pixel data.

Although embodiments of the invention are discussed primarily with respect to an H.264-compliant encoder, embodiments of the present invention may be adapted to any video encoder wherein selective information handling as described herein may be useful, such as in encoders employing parallel engines or a pipelined engine for processing macroblocks and sub-blocks. Furthermore, any acceptable architecture, topology, protocols, or other network and digital processing features can be employed. In general, certain modules and components discussed herein can be implemented in hardware, software, or via any device with processing ability or other requisite functionality. Techniques described herein may be suitable for use with other types of information processing. For example, the processing can operate on previously compressed or encoded image information, on three-dimensional image data, on non-visual information, etc.

Although specific processing sequences have been provided for processing data such as macroblocks, sub-blocks, slices, etc., any other suitable processing order or approach may be used. For example, any number of contiguous macroblocks may be in a slice. A slice can be a horizontal band but can also span horizontal bands, or be oriented vertically, diagonally, or in other non-horizontal directions.

Arrowheads shown on signal paths between various modules are for illustrative purposes only. For example, various communication paths or connecting lines, which appear to be unidirectional in the drawings, may be bidirectional without departing from the scope of the present teachings.

Although processes of the present invention and the hardware executing the processes maybe characterized by language common to a discussion of video processing (e.g., "FPGA," "CABAC," "intra 4×4 module," etc.), it should be apparent that operations of an embodiment of the present invention can execute on any type of suitable hardware or software in any communication relationship to another device on any type of link or network.

Although a process of the present invention may be presented as a single entity, such as software or hardware executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a transformation program and a quantization program, can be executing in a single module, or in different modules.

Although the invention has been discussed with respect, to specific example embodiments thereof, these embodiments are merely illustrative, and not restrictive, of the invention. In the description herein, numerous specific details are provided, such as examples of components and/or methods, to provide a thorough understanding of discussed example embodiments. One skilled in the relevant art will recognize, however, that certain embodiments can be practiced without one or more of the specific details, or with other apparatus, systems, assemblies, methods, components, materials, parts, and/or the like. In other instances, well-known structures, materials, or operations are not specifically shown or described in detail to avoid obscuring aspects of the example embodiments discussed herein.

A "machine-readable medium" or "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment not necessarily included in all possible example embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment or example embodiment discussed herein may be combined in any suitable manner with one or more other embodiments. It is to be understood that other variations and modifications of the embodiments described and illustrated herein are possible in light of the teachings herein, and the variations are to be considered as part of the spirit and scope of the present invention.

Example embodiments discussed herein may be implemented in whole or in part by using a programmed general purpose digital computer; by using application specific integrated circuits, programmable logic devices, FPGAs, optical, chemical, biological, quantum or nanoengineered systems or mechanisms; and so on. In general, the functions of various embodiments can be achieved by any means as is known in the art. Distributed or networked systems, components, and/or circuits can be used. Communication, or transfer of data may be wired, wireless, or by any other means.

It will also be appreciated that one or more of the elements depicted is the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated example embodiments, including what is described in the Abstract, is not intended to be exhaustive or to limit the invention to the precise forms disclosed herein. While certain example embodiments are described herein for illustrative purposes only, various equivalent modifications are possible within the spirit and scope of the present invention, as those skilled in the relevant art will recognize and appreciate. As indicated, these modifications may be made in light of the foregoing description of illustrated example embodiments and are to be included within the spirit and scope of the present invention.

Thus, while example embodiments have been described herein, a latitude of modification, various changes and substitutions are intended in the foregoing disclosures, and it will be appreciated that in some instances some features of embodiments will be employed without a corresponding use of other features without departing from the scope and spirit of the invention. Therefore, many modifications may be made to adapt a particular situation or material to the essential scope and spirit of the present invention. It is intended that the invention not be limited to the particular terms used in following claims and/or to a particular embodiment disclosed as the best mode contemplated for carrying out this invention, but that the invention will include any and all embodiments and equivalents falling within the scope of the appended claims.

What is claimed is:

1. A system for selectively handling information, the system comprising:
    first means for processing information pertaining to one or more sub-blocks of a macroblock in a first stream and a second stream, and outputting a first processed stream and a second processed stream in response thereto; and
    second, means for selectively combining information in the first processed stream and the second processed stream and providing an updated version of the first stream or the second stream to the first means in response thereto, wherein the second means includes a first pixel selector that is adapted to selectively employ a first portion of the first processed stream and a first portion of the second processed stream to generate the updated version of the first stream.

2. The system of claim 1, wherein the first means includes:
    a processor that is adapted to process a sub-block of a macroblock.

3. The system of claim 2, wherein the processor is adapted to perform intra prediction for the sub-block.

4. The system of claim 3, wherein the processor is adapted to process sub-blocks of a macroblock in parallel.

5. The system of claim 1, wherein the second means further includes:
    a second pixel selector that is adapted to selectively employ a second portion of the first processed stream and a second portion of the second processed stream to generate the updated version of the second stream.

6. The system of claim 5, further including a controller in communication with the first pixel selector and the second pixel selector, wherein the controller includes:
    one or more instructions for implementing a state machine.

7. The system of claim 6, wherein the state machine includes:
    one or more instructions for selectively directing contents of the first processed stream and the second processed stream into the updated first stream or the updated second stream.

8. The system of claim 1, wherein the first stream includes: information employed by the processor to process a first sequence of sub-blocks.

9. The system of claim 8, wherein the second stream includes:
    information employed by the processor to process a second sequence of sub-blocks.

10. The system of claim 9, wherein sub-blocks of the first sequence of sub-blocks and the second sequence of sub-blocks are consecutively numbered 0-15 according to H.264 standards.

11. The system of claim 10, wherein the processor is adapted to execute one or more instructions to process pairs of sub-blocks in parallel, including pairs numbered 2 and 4; 3 and 5; 8 and 6; 9 and 7; 10 and 12; and 11 and 13 after sub-blocks 0 and 1 have been processed by the processor.

12. An apparatus for selectively handling information, the apparatus comprising:
    a first operational mode associated with a first stream of data, wherein the first stream of data is associated with a first sequence of sub-blocks;
    a second operational mode associated with a second stream of data, wherein the second stream of data is associated with a second sequence of sub-blocks; and
    a processor adapted to implement one or more instructions for causing the first operational mode to switch to the second operational mode and to generate a control signal in response thereto, wherein the control signal is adapted to cause a selector to output a portion of the first stream or to output a portion of the second stream based on a block number associated with a sub-block of the first sequence or the second sequence.

13. An apparatus for selectively handling information, the apparatus comprising:
    a first switch adapted to selectively output a first portion of a first stream and a first portion of a second stream in a third stream; and
    a second switch adapted to selectively output a second portion of the first stream and a second portion of the second stream in a fourth stream, wherein the first stream is associated with a first sequence of sub-blocks of a macroblock, and wherein the second stream is associated with a second sequence of sub-blocks of a macroblock.

14. The apparatus of claim 13, wherein the third stream represents an updated version of the first stream.

15. The apparatus of claim 14, wherein the fourth stream represents an updated version of the second stream.

16. The apparatus of claim 15, wherein the first sequence and the second sequence include sub-blocks with interdependencies such that processing of certain sub-blocks from the first sequence may occur in parallel with processing of certain sub-blocks of the second sequence.

17. The apparatus of claim 16, wherein the processing includes H.264 intra prediction.

18. An apparatus for selectively handling information, the apparatus comprising:
    first means for establishing an operational mode;
    second means for determining a block number of a sub-block, wherein the sub-block is associated with a first stream or a second stream, and providing a first indication in response thereto; and
    third means for generating one or more control signals to control output of a third stream or fourth stream from a pixel selector based on the operational mode and the first indication.

19. The apparatus of claim 18, wherein the third stream includes:
    an updated version of the first stream.

20. The apparatus of claim 18, wherein the fourth stream includes:
    an updated version of the second stream.

21. A method for selectively handling information, the method comprising:
    using a first processor to process information pertaining to one or more sub-blocks of a macroblock in a first stream and a second stream;

using the first processor to output a first processed stream and a second processed stream in response to processing the information pertaining to the one or more sub-blocks of the macroblock;

using a second processor to selectively combine information in the first processed stream and the second processed stream; and using the second processor to provide an updated version of the first stream or the second stream to the first processor in response to selectively combining the information in the first processed stream and the second processed stream, wherein providing the updated version of the first stream comprises using a first pixel selector that is adapted to selectively employ a first portion of the first processed stream and a first portion of the second processed stream to provide the updated version of the first stream.

* * * * *